United States Patent
Cheng et al.

(10) Patent No.: US 10,977,400 B2
(45) Date of Patent: Apr. 13, 2021

(54) DETERMINISTIC TEST PATTERN GENERATION FOR DESIGNS WITH TIMING EXCEPTIONS

(71) Applicant: Mentor Graphics Corporation, Wilsonville, OR (US)

(72) Inventors: Wu-Tung Cheng, Lake Oswego, OR (US); Kun-Han Tsai, Lake Oswego, OR (US); Naixing Wang, Tigard, OR (US); Chen Wang, Lake Oswego, OR (US); Xijiang Lin, West Linn, OR (US); Mark A. Kassab, Wilsonville, OR (US); Irith Pomeranz, West Lafayette, IN (US)

(73) Assignee: Mentor Graphics Corporation, Wilsonville, OR (US)

( * ) Notice: Subject to any disclaimer, the term of this patent is extended or adjusted under 35 U.S.C. 154(b) by 0 days.

(21) Appl. No.: 16/548,172

(22) Filed: Aug. 22, 2019

(65) Prior Publication Data

US 2020/0410065 A1 Dec. 31, 2020

Related U.S. Application Data

(60) Provisional application No. 62/866,751, filed on Jun. 26, 2019.

(51) Int. Cl.
*G06F 30/30* (2020.01)
*G06F 119/12* (2020.01)

(52) U.S. Cl.
CPC .......... *G06F 30/30* (2020.01); *G06F 2119/12* (2020.01)

(58) Field of Classification Search
CPC .... G06F 30/30; G06F 2119/12; G06F 119/12; G01R 31/318547; G01R 31/318583
See application file for complete search history.

(56) References Cited

U.S. PATENT DOCUMENTS

| 7,984,354 | B2 | 7/2011 | Goswami et al. |
| 2007/0011527 | A1* | 1/2007 | Goswami ....... G01R 31/318583 714/726 |
| 2007/0245192 | A1* | 10/2007 | Furuya ........... G01R 31/318536 714/726 |
| 2016/0245863 | A1* | 8/2016 | Mrugalski ...... G01R 31/318547 |

OTHER PUBLICATIONS

B. R. Benware, et al., "Effectiveness Comparisons of Outlier Screening Methods for Frequency Dependent Defects on Complex ASICs", in Proc. of the 21st IEEE VLSI Test Symp., 2003, pp. 39-46.
W. Needham, et al., "High Volume Microprocessor Test Escapes, an Analysis of Defects our Tests are Missing", in Proc. Int. Test Conf., 1998, pp. 25-34.

(Continued)

*Primary Examiner* — Vuthe Siek

(57) ABSTRACT

Systems and methods for a deterministic automatic test generation (ATPG) process including Timing Exception ATPG (TEA). A method includes performing an automated test pattern generation (ATPG) process that uses timing exception information to generate a test pattern for a targeted fault of a circuit design with at least one timing exception path. The method includes testing the targeted fault of the circuit design using the test pattern to produce a test result for the targeted fault.

20 Claims, 15 Drawing Sheets

(56) References Cited

OTHER PUBLICATIONS

J. P. Roth, "Diagnosis of Automata Failures: A Calculus and a Method", IBM J. Res. Develop., Jul. 1966, vol. 10, pp. 278-291.

P. Goel, "An Implicit Enumeration Algorithm to Generate Tests for Combinational Logic Circuits", IEEE Trans. Comput., Mar. 1981, vol. C-30, pp. 215-222.

X. Lin, et al., "High-Frequency, At-Speed Scan Testing", IEEE Design Test of Computers, Sep.-Oct. 2003, vol. 20, No. 5, pp. 17-25.

N. Tendolkar, et al., "Novel Techniques for Achieving High At-Speed Transition Fault Test Coverage for Motorola's Microprocessors Based on PowerPc Instruction Set Architecture", in Proc. of the 20th VLSI Test Symp., 2002, pp. 3-8.

J. Saxena, et al., "Scan-Based Transition Fault Testing—Implementation and Low Cost Test Challenges", in Proc. Int. Test Conf., 2002, pp. 1120-1129.

B. Cory, et al., "Speed Binning with Path Delay Test in 150-nm Technology", IEEE Design Test of Computers, Sep.-Oct. 2003, vol. 20, No. 5, pp. 41-45.

K. S. Kim, et al., "Delay Defect Characteristics and Testing Strategies", IEEE Design Test of Computers, 2003, vol. 20, No. 5, pp. 8-16.

J. Rearick, "Too Much Delay Fault Coverage is a Bad Thing", in Proc. Int. Test Conf., 2001, pp. 624-633.

M. Ohta, "On Validating Data Hold Times for Flip-Flops in Sequential Circuits", in Proc. Int. Test Conf., 2000, pp. 317-325.

T. L. McLaurin, et al., "Enhanced Testing of Clock Faults", in Proc. Int. Test Conf., 2007, pp. 1-9.

V. Vorisek, et al., "Improved Handling of False and Multicycle Paths in ATPG", in Proc. of the 24th VLSI Test Symp., 2006, pp. 160-165.

D. Goswami, et al., "Test Generation in the Presence of Timing Exceptions and Constraints", in Proc. Design Autom. Conf., 2007, pp. 688-693.

K.-H. Tsai, et al., "Multicycle-Aware At-speed Test Methodology", in Proc. Asian Test Symp., 2013, pp. 49-55.

K.-H. Tsai, et al., "Test Coverage Analysis for Designs with Timing Exceptions", in Proc. Asian Test Symp., 2017, pp. 169-174.

* cited by examiner

| AND | | |
|---|---|---|
| A | B | Y |
| D(1T) | 1T | D(1T) |
| 1T | D(1T) | D(1T) |
| $\overline{D}$(0T) | 1T | $\overline{D}$(0T) |
| 1T | $\overline{D}$(0T) | $\overline{D}$(0T) |

FIG. 12A

| OR | | |
|---|---|---|
| A | B | Y |
| D(1T) | 0T | D(1T) |
| 0T | D(1T) | D(1T) |
| $\overline{D}$(0T) | 0T | $\overline{D}$(0T) |
| 0T | $\overline{D}$(0T) | $\overline{D}$(0T) |

FIG. 12B

| XOR | | |
|---|---|---|
| A | B | Y |
| D(1T) | 0T, 1T | D(1T), $\overline{D}$(0T) |
| 0T, 1T | D(1T) | D(1T), $\overline{D}$(0T) |
| $\overline{D}$(0T) | 0T, 1T | $\overline{D}$(0T), D(1T) |
| 0T, 1T | $\overline{D}$(0T) | $\overline{D}$(0T), D(1T) |

FIG. 12C

| MUX | | | |
|---|---|---|---|
| S | X0 | X1 | Y |
| D(1T) | 0T, 1T | 1T, 0T | D(1T), $\overline{D}$(0T) |
| $\overline{D}$(0T) | 0T, 1T | 1T, 0T | $\overline{D}$(0T), D(1T) |
| 0T | D(1T), $\overline{D}$(0T) | - | D(1T), $\overline{D}$(0T) |
| 1T | - | D(1T), $\overline{D}$(0T) | D(1T), $\overline{D}$(0T) |

FIG. 12D

| AND | | |
|---|---|---|
| A | B | Y |
| 0B | - | 0B |

| AND | | |
|---|---|---|
| A | B | Y |
| 0A | 0B | 0B |
| 0A | 0A | 0A |
| 0A | 0U | 0U |
| 0A | 1B | 0A |
| 0A | 1A | 0A |
| 0A | 1U | 0A |
| 0A | XB | 0U |
| 0A | XA | 0A |
| 0A | XU | 0U |

| AND | | |
|---|---|---|
| A | B | Y |
| 0U | 0B | 0B |
| 0U | 0A | 0U |
| 0U | 0U | 0U |
| 0U | 1B | 0U |
| 0U | 1A | 0U |
| 0U | 1U | 0U |
| 0U | XB | 0U |
| 0U | XA | 0U |
| 0U | XU | 0U |

| AND | | |
|---|---|---|
| A | B | Y |
| 1B | 0B | 0B |
| 1B | 0A | 0A |
| 1B | 0U | 0U |
| 1B | 1B | 1B |
| 1B | 1A | 1A |
| 1B | 1U | 1U |
| 1B | XB | XB |
| 1B | XA | XA |
| 1B | XU | XU |

| AND | | |
|---|---|---|
| A | B | Y |
| 1A | 0B | 0B |
| 1A | 0A | 0A |
| 1A | 0U | 0U |
| 1A | 1B | 1B |
| 1A | 1A | 1A |
| 1A | 1U | 1U |
| 1A | XB | XU |
| 1A | XA | XA |
| 1A | XU | XU |

| AND | | |
|---|---|---|
| A | B | Y |
| 1U | 0B | 0B |
| 1U | 0A | 0A |
| 1U | 0U | 0U |
| 1U | 1B | 1U |
| 1U | 1A | 1A |
| 1U | 1U | 1U |
| 1U | XB | XU |
| 1U | XA | XA |
| 1U | XU | XU |

| AND | | |
|---|---|---|
| A | B | Y |
| XB | 0B | 0B |
| XB | 0A | 0U |
| XB | 0U | 0U |
| XB | 1B | XB |
| XB | 1A | XU |
| XB | 1U | XU |
| XB | XB | XB |
| XB | XA | XU |
| XB | XU | XU |

| AND | | |
|---|---|---|
| A | B | Y |
| XA | 0B | 0B |
| XA | 0A | 0A |
| XA | 0U | 0U |
| XA | 1B | XA |
| XA | 1A | XA |
| XA | 1U | XA |
| XA | XB | XU |
| XA | XA | XA |
| XA | XU | XU |

| AND | | |
|---|---|---|
| A | B | Y |
| XU | 0B | 0B |
| XU | 0A | 0U |
| XU | 0U | 0U |
| XU | 1B | XU |
| XU | 1A | XU |
| XU | 1U | XU |
| XU | XB | XU |
| XU | XA | XU |
| XU | XU | XU |

FIG. 13

| OR | | |
|---|---|---|
| A | B | Y |
| 1B | - | 1B |

| OR | | |
|---|---|---|
| A | B | Y |
| 0B | 0B | 0B |
| 0B | 0A | 0A |
| 0B | 0U | 0U |
| 0B | 1B | 1B |
| 0B | 1A | 1A |
| 0B | 1U | 1U |
| 0B | XB | XB |
| 0B | XA | XA |
| 0B | XU | XU |

| OR | | |
|---|---|---|
| A | B | Y |
| 0A | 0B | 0A |
| 0A | 0A | 0A |
| 0A | 0U | 0U |
| 0A | 1B | 1B |
| 0A | 1A | 1A |
| 0A | 1U | 1U |
| 0A | XB | XU |
| 0A | XA | XA |
| 0A | XU | XU |

| OR | | |
|---|---|---|
| A | B | Y |
| 0U | 0B | 0U |
| 0U | 0A | 0A |
| 0U | 0U | 0U |
| 0U | 1B | 1B |
| 0U | 1A | 1A |
| 0U | 1U | 1U |
| 0U | XB | XU |
| 0U | XA | XA |
| 0U | XU | XU |

| OR | | |
|---|---|---|
| A | B | Y |
| 1A | 0B | 1A |
| 1A | 0A | 1A |
| 1A | 0U | 1A |
| 1A | 1B | 1B |
| 1A | 1A | 1A |
| 1A | 1U | 1U |
| 1A | XB | 1U |
| 1A | XA | 1A |
| 1A | XU | 1U |

| OR | | |
|---|---|---|
| A | B | Y |
| 1U | 0B | 1U |
| 1U | 0A | 1U |
| 1U | 0U | 1U |
| 1U | 1B | 1B |
| 1U | 1A | 1U |
| 1U | 1U | 1U |
| 1U | XB | 1U |
| 1U | XA | 1U |
| 1U | XU | 1U |

| OR | | |
|---|---|---|
| A | B | Y |
| XB | 0B | XB |
| XB | 0A | XU |
| XB | 0U | XU |
| XB | 1B | 1B |
| XB | 1A | 1U |
| XB | 1U | 1U |
| XB | XB | XB |
| XB | XA | XU |
| XB | XU | XU |

| OR | | |
|---|---|---|
| A | B | Y |
| XA | 0B | XA |
| XA | 0A | XA |
| XA | 0U | XA |
| XA | 1B | 1B |
| XA | 1A | 1A |
| XA | 1U | 1U |
| XA | XB | XU |
| XA | XA | XA |
| XA | XU | XU |

| OR | | |
|---|---|---|
| A | B | Y |
| XU | 0B | XU |
| XU | 0A | XU |
| XU | 0U | XU |
| XU | 1B | 1B |
| XU | 1A | 1U |
| XU | 1U | 1U |
| XU | XB | XU |
| XU | XA | XU |
| XU | XU | XU |

FIG. 14

| XOR | | |
|---|---|---|
| A | B | Y |
| XA | - | XA |

| XOR | | |
|---|---|---|
| A | B | Y |
| 0B | 0B | 0B |
| 0B | 0A | 0A |
| 0B | 0U | 0U |
| 0B | 1B | 1B |
| 0B | 1A | 1A |
| 0B | 1U | 1U |
| 0B | XB | XB |
| 0B | XA | XA |
| 0B | XU | XU |

| XOR | | |
|---|---|---|
| A | B | Y |
| 0A | 0B | 0A |
| 0A | 0A | 0A |
| 0A | 0U | 0A |
| 0A | 1B | 1A |
| 0A | 1A | 1A |
| 0A | 1U | 1A |
| 0A | XB | XA |
| 0A | XA | XA |
| 0A | XU | XA |

| XOR | | |
|---|---|---|
| A | B | Y |
| 0U | 0B | 0U |
| 0U | 0A | 0A |
| 0U | 0U | 0U |
| 0U | 1B | 1U |
| 0U | 1A | 1A |
| 0U | 1U | 1U |
| 0U | XB | XU |
| 0U | XA | XA |
| 0U | XU | XU |

| XOR | | |
|---|---|---|
| A | B | Y |
| 1B | 0B | 1B |
| 1B | 0A | 1A |
| 1B | 0U | 1U |
| 1B | 1B | 0B |
| 1B | 1A | 0A |
| 1B | 1U | 0U |
| 1B | XB | XB |
| 1B | XA | XA |
| 1B | XU | XU |

| XOR | | |
|---|---|---|
| A | B | Y |
| 1A | 0B | 1A |
| 1A | 0A | 1A |
| 1A | 0U | 1A |
| 1A | 1B | 0A |
| 1A | 1A | 0A |
| 1A | 1U | 0A |
| 1A | XB | XA |
| 1A | XA | XA |
| 1A | XU | XA |

| XOR | | |
|---|---|---|
| A | B | Y |
| 1U | 0B | 1U |
| 1U | 0A | 1A |
| 1U | 0U | 1U |
| 1U | 1B | 0U |
| 1U | 1A | 0A |
| 1U | 1U | 0U |
| 1U | XB | XU |
| 1U | XA | XA |
| 1U | XU | XU |

| XOR | | |
|---|---|---|
| A | B | Y |
| XB | 0B | XB |
| XB | 0A | XA |
| XB | 0U | XU |
| XB | 1B | XU |
| XB | 1A | XA |
| XB | 1U | XU |
| XB | XB | XU |
| XB | XA | XA |
| XB | XU | XU |

| XOR | | |
|---|---|---|
| A | B | Y |
| XU | 0B | XU |
| XU | 0A | XA |
| XU | 0U | XU |
| XU | 1B | XU |
| XU | 1A | XA |
| XU | 1U | XU |
| XU | XB | XU |
| XU | XA | XA |
| XU | XU | XU |

FIG. 15

| MUX | | | |
|---|---|---|---|
| s | X0 | X1 | Y |
| XB | 1B | 0B | XB |
| XB | 1B | 0A | XU |
| XB | 1B | 0U | XU |
| XB | 1B | 1B | 1B |
| XB | 1B | 1A | 1U |
| XB | 1B | 1U | 1U |
| XB | 1B | XB | XB |
| XB | 1B | XA | XU |
| XB | 1B | XU | XU |

| MUX | | | |
|---|---|---|---|
| s | X0 | X1 | Y |
| XB | 1A | 0B | XU |
| XB | 1A | 0A | XA |
| XB | 1A | 0U | XU |
| XB | 1A | 1B | 1U |
| XB | 1A | 1A | 1A |
| XB | 1A | 1U | 1U |
| XB | 1A | XB | XU |
| XB | 1A | XA | XA |
| XB | 1A | XU | XU |

| MUX | | | |
|---|---|---|---|
| s | X0 | X1 | Y |
| XB | 1U | 0B | XU |
| XB | 1U | 0A | XU |
| XB | 1U | 0U | XU |
| XB | 1U | 1B | 1U |
| XB | 1U | 1A | 1U |
| XB | 1U | 1U | 1U |
| XB | 1U | XB | XU |
| XB | 1U | XA | XU |
| XB | 1U | XU | XU |

| MUX | | | |
|---|---|---|---|
| s | X0 | X1 | Y |
| XB | 0B | 0B | 0B |
| XB | 0B | 0A | 0U |
| XB | 0B | 0U | 0U |
| XB | 0B | 1B | XB |
| XB | 0B | 1A | XU |
| XB | 0B | 1U | XU |
| XB | 0B | XB | XB |
| XB | 0B | XA | XU |
| XB | 0B | XU | XU |

| MUX | | | |
|---|---|---|---|
| s | X0 | X1 | Y |
| XB | 0A | 0B | 0U |
| XB | 0A | 0A | 0A |
| XB | 0A | 0U | 0U |
| XB | 0A | 1B | XU |
| XB | 0A | 1A | XA |
| XB | 0A | 1U | XU |
| XB | 0A | XB | XU |
| XB | 0A | XA | XA |
| XB | 0A | XU | XU |

FIG. 17A

| MUX | | | |
|---|---|---|---|
| s | X0 | X1 | Y |
| XA | 0B, 0A, 0U | 0B, 0A, 0U | 0A |
| XA | 1B, 1A, 1U | 1B, 1A, 1U | 1A |

FIG. 18

| MUX | | | |
|---|---|---|---|
| s | X0 | X1 | Y |
| XB | 0U | 0B | 0U |
| XB | 0U | 0A | 0U |
| XB | 0U | 0U | 0U |
| XB | 0U | 1B | XU |
| XB | 0U | 1A | XU |
| XB | 0U | 1U | XU |
| XB | 0U | XB | XU |
| XB | 0U | XA | XU |
| XB | 0U | XU | XU |

| MUX | | | |
|---|---|---|---|
| s | X0 | X1 | Y |
| XB | XB | 0B | XB |
| XB | XB | 0A | XU |
| XB | XB | 0U | XU |
| XB | XB | 1B | XB |
| XB | XB | 1A | XU |
| XB | XB | 1U | XU |
| XB | XB | XB | XB |
| XB | XB | XA | XU |
| XB | XB | XU | XU |

| MUX | | | |
|---|---|---|---|
| s | X0 | X1 | Y |
| XB | XA | 0B | XU |
| XB | XA | 0A | XA |
| XB | XA | 0U | XU |
| XB | XA | 1B | XU |
| XB | XA | 1A | XA |
| XB | XA | 1U | XU |
| XB | XA | XB | XU |
| XB | XA | XA | XA |
| XB | XA | XU | XU |

| MUX | | | |
|---|---|---|---|
| s | X0 | X1 | Y |
| XB | XU | 0B | XU |
| XB | XU | 0A | XU |
| XB | XU | 0U | XU |
| XB | XU | 1B | XU |
| XB | XU | 1A | XU |
| XB | XU | 1U | XU |
| XB | XU | XB | XU |
| XB | XU | XA | XU |
| XB | XU | XU | XU |

FIG. 17B

| MUX | | | |
|---|---|---|---|
| s | X0 | X1 | Y |
| XU | 0B, 0U | 0B, 0U | 0U |
| XU | 0A | 0B, 0U | 0U |
| XU | 0B, 0U | 0A | 0U |
| XU | 1B, 1U | 1B, 1U | 1U |
| XU | 1A | 1B, 1U | 1U |
| XU | 1B, 1U | 1A | 1U |

| MUX | | | |
|---|---|---|---|
| s | X0 | X1 | Y |
| XU | 0A | 0A | 0A |
| XU | 0A | 1A | XA |
| XU | 0A | XA | XA |
| XU | 1A | 0A | XA |
| XU | 1A | 1A | 1A |
| XU | 1A | XA | XA |
| XU | XA | 0A | XA |
| XU | XA | 1A | XA |
| XU | XA | XA | XA |

| AND | | |
|---|---|---|
| Y | A | B |
| 0T | 0T | - |
| 0T | - | 0T |
| 1T | 1T | 1T |

FIG. 20B

| OR | | |
|---|---|---|
| Y | A | B |
| 0T | 0T | 0T |
| 1T | 1T | - |
| 1T | - | 1T |

FIG. 20C

| XOR | | |
|---|---|---|
| Y | A | B |
| 0T | 0T | 0T |
| 0T | 1T | 1T |
| 1T | 0T | 1T |
| 1T | 1T | 0T |

FIG. 20D

| MUX | | | |
|---|---|---|---|
| Y | s | X0 | X1 |
| 0T | 0T | 0T | - |
| 0T | XT | 0T | 0T |
| 0T | 1T | - | 0T |
| 1T | 0T | 1T | - |
| 1T | XT | 1T | 1T |
| 1T | 1T | - | 0T |

FIG. 21A

| AND | | |
|---|---|---|
| Y | A | B |
| 0B | 0B | - |
| 0B | - | 0B |
| 1B | 1B | 1B |

FIG. 21B

| OR | | |
|---|---|---|
| Y | A | B |
| 0B | 0B | 0B |
| 1B | 1B | - |
| 1B | - | 1B |

FIG. 21C

| XOR | | |
|---|---|---|
| Y | A | B |
| 0B | 0B | 0B |
| 0B | 1B | 1B |
| 1B | 0B | 1B |
| 1B | 1B | 0B |

FIG. 21D

| MUX | | | |
|---|---|---|---|
| Y | s | X0 | X1 |
| 0B | 0B | 0B | - |
| 0B | 1B | - | 0B |
| 1B | 0B | 1B | - |
| 1B | 1B | - | 0B |

DETERMINISTIC TEST PATTERN GENERATION FOR DESIGNS WITH TIMING EXCEPTIONS

CROSS-REFERENCE TO RELATED APPLICATION

This application claims the benefit of the filing date of U.S. Provisional Patent Application 62/866,751, filed Jun. 26, 2019, which is hereby incorporated by reference.

TECHNICAL FIELD

The disclosed technology is directed techniques for circuit design, testing, and manufacture.

BACKGROUND OF THE DISCLOSURE

Electronic circuits, such as integrated microcircuits, are used in a variety of products, from automobiles to microwaves to personal computers. Designing and fabricating microcircuit devices typically involves many steps, known as a "design flow." The particular steps of a design flow often are dependent upon the type of microcircuit being designed, its complexity, the design team, and the microcircuit fabricator or foundry that will manufacture the microcircuit. Typically, software and hardware tools will verify a design at various stages of the design flow by running software simulators and/or hardware emulators, and errors in the design are corrected.

Several steps are common to most design flows. Initially, the specification for the new microcircuit is transformed into a logical design, sometimes referred to as a register transfer level (RTL) description of the circuit. With this logical design, the circuit is described in terms of both the exchange of signals between hardware registers and the logical operations that are performed on those signals. The logical design typically employs a hardware design language (HDL), such as the very high speed integrated circuit hardware design language (VHDL). The logic of the circuit is then analyzed, to confirm that the logic incorporated into the design will accurately perform the functions desired for the circuit. This analysis is sometimes referred to as "functional verification."

Automatic Test Pattern Generation (ATPG) patterns that utilize scan chains to provide stimulus and capture responses from circuitry is a standard approach for manufacture testing to achieve test coverage in digital logic circuits. A "scan chain" technique is used in design for testing and makes testing easier by providing a simple way to set and observe every flip-flop in an integrated circuit (IC).

In a full scan design, automatic test pattern generation (ATPG) is particularly simple. No sequential pattern generation is required—combinatorial tests, which are much easier to generate, will suffice. In a chip that does not have a full scan design—i.e., the chip has sequential circuits, such as memory elements that are not part of the scan chain, sequential pattern generation is required. Test pattern generation for sequential circuits searches for a sequence of vectors to detect a particular fault through the space of all possible vector sequences.

Even a simple stuck-at fault requires a sequence of vectors for detection in a sequential circuit. Also, due to the presence of memory elements, the controllability and observability of the internal signals in a sequential circuit are in general much more difficult than those in a combinational logic circuit. These factors make the complexity of sequential ATPG much higher than that of combinational ATPG.

After the accuracy of the logical design is confirmed, it is converted into a device design by synthesis software. The device design, which is typically in the form of a schematic or netlist, describes the specific electronic devices (such as transistors, resistors, and capacitors) that will be used in the circuit, along with their interconnections. This logic generally corresponds to the level of representation displayed in conventional circuit diagrams. Preliminary timing estimates for portions of the circuit may be made at this stage, using an assumed characteristic speed for each device. In addition, the relationships between the electronic devices are analyzed, to confirm that the circuit described by the device design will correctly perform the functions desired for the circuit. This analysis is sometimes referred to as "formal verification."

Once the relationships between circuit devices have been established, the design is again transformed, this time into a physical design that describes specific geometric elements. This type of design often is referred to as a "layout" design. The geometric elements define the shapes that will be created in various materials to actually manufacture the circuit device components (e.g., contacts, gates, etc.) making up the circuit. While the geometric elements are typically polygons, other shapes, such as circular and elliptical shapes, also may be employed. These geometric elements may be custom designed, selected from a library of previously created designs, or some combination of both. Geometric elements also are added to form the connection lines that will interconnect these circuit devices. Layout tools (often referred to as "place and route" tools), such as Mentor Graphics' IC Station or Cadence's Virtuoso, are commonly used for both of these tasks.

With a layout design, each physical layer of the microcircuit will have a corresponding layer representation, and the geometric elements described in a layer representation will define the relative locations of the circuit device components that will make up a circuit device. Thus, the geometric elements in the representation of an implant layer will define the regions where doping will occur, while the geometric elements in the representation of a metal layer will define the locations in a metal layer where conductive wires used will be formed to connect the circuit devices. Typically, a designer will perform a number of analyses on the layout design. For example, the layout design may be analyzed to confirm that it accurately represents the circuit devices and their relationships described in the device design. The layout design also may be analyzed to confirm that it complies with various design requirements, such as minimum spacing between geometric elements. Still further, it may be modified to include the use of redundant or other compensatory geometric elements intended to counteract limitations in the manufacturing process, etc. This analysis is sometimes referred to as "physical verification."

After the layout design has been finalized, then it is converted into a format that can be employed by a mask or reticle writing tool to create a mask or reticle for use in a photolithographic manufacturing process. Masks and reticles are typically made using tools that expose a blank reticle to an electron or laser beam. Most mask writing tools can only "write" certain kinds of polygons, however, such as right triangles, rectangles or other trapezoids. Moreover, the sizes of the polygons are limited physically by the maximum beam aperture size available to the tool. Accordingly, larger geometric elements in the layout design, or geometric elements that are not basic right triangles, rectangles or trapezoids (which typically is a majority of the geometric elements in a layout design) must be "fractured" into the smaller, more basic polygons that can be written by the mask or reticle writing tool.

Once the layout design has been fractured, then the layout design data can be converted to a format compatible with the mask or reticle writing tool. Examples of such formats are manufacturing electron beam exposure system (MEBES), for raster scanning machines manufactured by ETEC, an Applied Materials Company, the ".MIC" format from Micronics AB in Sweden, and various vector scan formats for Nuflare, JEOL, and Hitachi machines, such as VSB12 or VSB12. The written masks or reticles can then be used in a photolithographic process to expose selected areas of a wafer in order to produce the desired integrated circuit devices on the wafer.

SUMMARY OF THE DISCLOSURE

Various disclosed embodiments include an ATPG process referred to herein as Timing Exception ATPG (TEA). A TEA process as disclosed can prevent the generated test patterns from being impacted by timing exceptions. The TEA process is compatible with existing simulation-based approaches. In a simulation environment, TEA is complete such that for a target fault, the test pattern generated is guaranteed to detect it. If a test pattern cannot be generated using TEA, the target fault is untestable given the timing exception paths in the design and the existing simulation environment. Compared to the existing simulation-based approaches, using the disclosed TEA process can generate a more effective test set, improving test coverage, test pattern count, and the total ATPG run time significantly. The disclosed TEA process improves the overall test quality, reduces test cost, and significantly increases the test generation productivity in the presence of timing exception paths.

One method includes performing an automated test pattern generation (ATPG) process that uses timing exception information to generate a test pattern for a targeted fault of a circuit design with at least one timing exception path. The method includes testing the targeted fault of the circuit design using the test pattern to produce a test result for the targeted fault.

In various embodiments, the method also includes combining timing exception values (T-values) with logic values to indicate a required to-point (RTP) for detecting the fault in the circuit design.

In various embodiments, the timing exception path includes one or more of a setup time exception, a hold time exception, a multicycle path, or a conditional timing exception. In various embodiments, the timing exception information includes T-values for indicating a triggered from-point (TFP) and an activated timing-exception path (ATEP). In various embodiments, the TFP is a from-point of a timing exception path, of the at least one timing exception path, that is triggered by a defined timing exception event, and the ATEP includes forward propagation paths of the TFP. In various embodiments, testing the targeted fault of the circuit design includes using an RTP, a TFP, and an ATEP to produce the test result of the fault. In various embodiments, the T-values are three timing exception values that indicate that a gate is a part of an activated timing-exception path (ATEP) (A), that the gate cannot be a part of an ATEP (B), or that it is undetermined whether the gate can be a part of an ATEP (U), and the T-values are combined with logic values 1, 0, and X in logic combinations of 0A, 0B, 0U, 1A, 1B, 1U, XA, XB, and XU, where X indicates a don't-care, and the logic combinations are used for an ATPG implication process of the ATPG process. In various embodiments, the logic values also include a Z value to support gates which produce or consume a high impedance value. In various embodiments, the ATPG process produces a test cube, and the test pattern is generated based on the test cube.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIGS. 12A-12D illustrate a D-propagation truth tables using T-values in accordance with disclosed embodiments;

FIG. 13 illustrates a nine-value implication table for a 2-input AND gate using T-values in combination with logic values in accordance with disclosed embodiments;

FIG. 14 illustrates a nine-value implication table for a 2-input OR gate using T-values in combination with logic values in accordance with disclosed embodiments;

FIG. 15 illustrates a nine-value implication table for a 2-input XOR gate using T-values in combination with logic values in accordance with disclosed embodiments;

FIGS. 17A and 17B illustrate a nine-value implication table for a 2×1 multiplexer using T-values in combination with logic values in accordance with disclosed embodiments;

FIG. 18 illustrates a nine-value implication table for a 2×1 multiplexer using T-values in combination with logic values in accordance with disclosed embodiments;

FIG. 19 illustrates a nine-value implication table for a 2×1 multiplexer using T-values in combination with logic values in accordance with disclosed embodiments;

FIGS. 20A-20D illustrate nine-value J-justification truth tables in accordance with disclosed embodiments; and FIGS. 21A-21D illustrate nine-value justification truth tables in accordance with disclosed embodiments.

DETAILED DESCRIPTION

Figure 1:
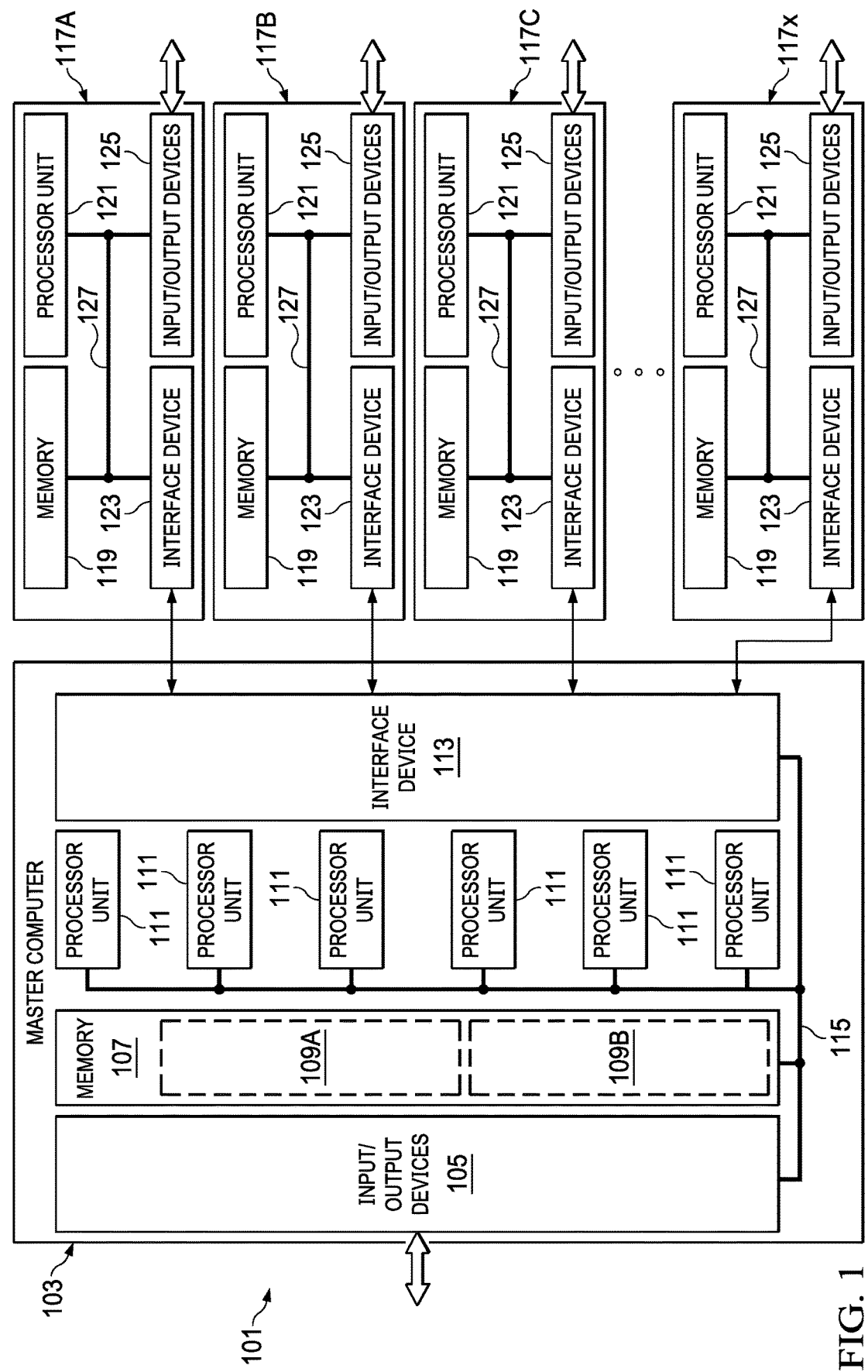
FIGS. 1 and 2 illustrate components of a computer system that may be used to implement various embodiments of the disclosed technology.

The Figures discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

An ATPG process can include three primary steps of test generation, "good" simulation, and fault simulation. Timing exceptions are commonly used to indicate that the timing of certain paths have been relaxed so as to enable the design to meet timing closure. Generating scan-based test patterns without considering timing exceptions can lead to invalid test responses, resulting in unpredictable test quality impact. Existing simulation-based solutions mask out unreliable signals after a test pattern is generated. If the signals required for detecting the target fault are unreliable and masked out, the generated test pattern fails to detect the target fault, and it is discarded. To achieve an acceptable test coverage, several iterations of test generation are typically required where different tests are generated for target faults.

One approach addresses these issues only partially during the simulation steps to attempt to ensure the correctness of the ATPG patterns for designs with timing exceptions, such as described in U.S. Pat. No. 7,984,354, incorporated herein by reference. However, the approach described in that document cannot guarantee to achieve high test coverage since the timing exceptions are not considered during the test generation process. Many testable faults are undetected under the current solution. Consequently, the test quality is suffered for the design with timing exceptions, which is very common in today industrial circuits. The prior patent focuses on the good simulation step and masks any unreliable transitions from the timing exceptions, so the created ATPG patterns are good and do not cause unexpected silicon failures. However, since the timing exceptions are not considered during the test generation process, the technique described in that document can create ineffective patterns that do not detect the targeted faults after the masking effect from the timing exceptions during simulation.

Disclosed embodiments include an ATPG process referred to herein as Timing Exception ATPG (TEA). A TEA process as disclosed can prevent the generated test patterns from being impacted by timing exceptions. The TEA process is compatible with existing simulation-based approaches. In a simulation environment, TEA is complete such that for a target fault, the test pattern generated is guaranteed to detect it. If a test pattern cannot be generated using TEA, the target fault is untestable given the timing exception paths in the design and the existing simulation environment. Compared to the existing simulation-based approaches, using the disclosed TEA process can generate a more effective test set, improving test coverage, test pattern count, and the total ATPG run time significantly.

Illustrative Operating Environment

The execution of various processes described herein may be implemented using computer-executable software instructions executed by one or more programmable computing devices. Because these processes may be implemented using software instructions, the components and operation of a generic programmable computer system on which various embodiments of these processes may be employed will first be described. Further, because of the complexity of some electronic design and testing processes and the large size of many circuit designs, various electronic design and testing tools are configured to operate on a computing system capable of simultaneously running multiple processing threads. The components and operation of a computer system having a host or master computer and one or more remote or slave computers therefore will be described with reference to FIG. 1. This operating environment is only one example of a suitable operating environment, however, and is not intended to suggest any limitation as to the scope of use or functionality of any implementations of the invention.

In FIG. 1, the computer system 101 includes a master computer 103. In the illustrated example, the master computer 103 is a multi-processor computer that includes a plurality of input and output devices 105 and a memory 107. The input and output devices 105 may include any device for receiving input data from or providing output data to a user. The input devices may include, for example, a keyboard, microphone, scanner or pointing device for receiving input from a user. The output devices may then include a display monitor, speaker, printer or tactile feedback device. These devices and their connections are well known in the art, and thus will not be discussed at length here.

The memory 107 may similarly be implemented using any combination of computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other non-transitory storage medium that can be used to store desired information. As used herein, the term "non-transitory" refers to the ability to store information for subsequent retrieval at a desired time, as opposed to propagating electromagnetic signals.

As will be discussed in detail below, the master computer 103 runs a software application for performing one or more operations according to various examples of the invention. Accordingly, the memory 107 stores software instructions 109A that, when executed, will implement a software application for performing one or more operations. The memory 107 also stores data 109B to be used with the software application. In the illustrated embodiment, the data 109B contains process data that the software application uses to perform the operations, at least some of which may be parallel.

The master computer 103 also includes a plurality of processor units 111 and an interface device 113. The processor units 111 may be any type of processor device that can be programmed to execute the software instructions 109A, but will conventionally be a microprocessor device. For example, one or more of the processor units 111 may be a commercially generic programmable microprocessor, such as Intel® Pentium® or Xeon™ microprocessors, Advanced Micro Devices Athlon™ microprocessors or Motorola 68K/Coldfire®. microprocessors. Alternately or additionally, one or more of the processor units 111 may be a custom-manufactured processor, such as a microprocessor designed to optimally perform specific types of mathematical operations. The interface device 113, the processor units 111, the memory 107 and the input/output devices 105 are connected together by a bus 115.

Figure 2:
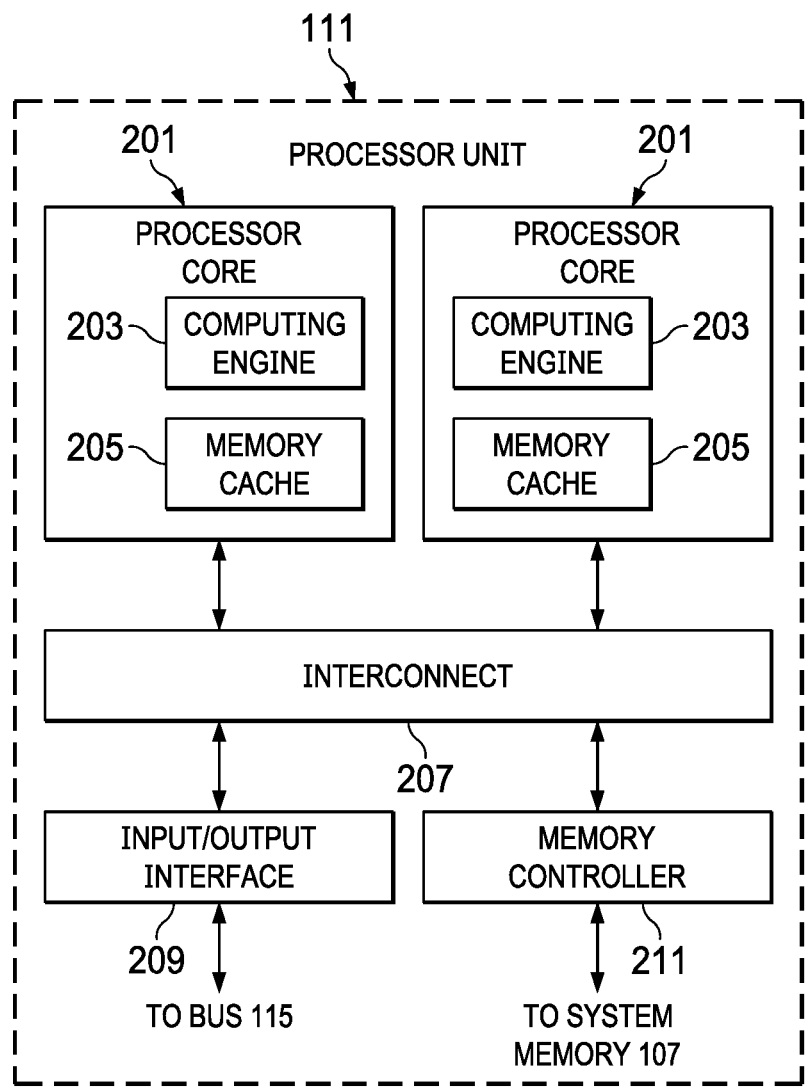

With some implementations of the invention, the master computer 103 may employ one or more processing units 111 having more than one processor core. Accordingly, FIG. 2 illustrates an example of a multi-core processor unit 111 that may be employed with various embodiments of the invention. As seen in this figure, the processor unit 111 includes a plurality of processor cores 201. Each processor core 201 includes a computing engine 203 and a memory cache 205. As known to those of ordinary skill in the art, a computing engine contains logic devices for performing various computing functions, such as fetching software instructions and then performing the actions specified in the fetched instructions. These actions may include, for example, adding, subtracting, multiplying, and comparing numbers, performing logical operations such as AND, OR, NOR and XOR, and retrieving data. Each computing engine 203 may then use its corresponding memory cache 205 to quickly store and retrieve data and/or instructions for execution.

Each processor core 201 is connected to an interconnect 207. The particular construction of the interconnect 207 may vary depending upon the architecture of the processor unit 201. With some processor cores 201, such as the Cell microprocessor created by Sony Corporation, Toshiba Corporation and IBM Corporation, the interconnect 207 may be implemented as an interconnect bus. With other processor units 201, however, such as the Opteron™ and Athlon™ dual-core processors available from Advanced Micro Devices of Sunnyvale, Calif., the interconnect 207 may be implemented as a system request interface device. In any case, the processor cores 201 communicate through the interconnect 207 with an input/output interfaces 209 and a memory controller 211. The input/output interface 209 provides a communication interface between the processor unit 201 and the bus 115. Similarly, the memory controller 211 controls the exchange of information between the processor unit 201 and the system memory 107. With some implementations of the invention, the processor units 201 may include additional components, such as a high-level cache memory accessible shared by the processor cores 201.

While FIG. 2 shows one illustration of a processor unit 201 that may be employed by some embodiments of the invention, it should be appreciated that this illustration is representative only, and is not intended to be limiting. It also should be appreciated that, with some implementations, a multi-core processor unit 111 can be used in lieu of multiple, separate processor units 111. For example, rather than employing six separate processor units 111, an alternate implementation of the computing system 101 may employ a single processor unit 111 having six cores, two multi-core processor units each having three cores, a multi-core processor unit 111 with four cores together with two separate single-core processor units 111, etc.

Returning now to FIG. 1, the interface device 113 allows the master computer 103 to communicate with the slave computers 117A, 117B, 117C . . . 117x through a communication interface. The communication interface may be any suitable type of interface including, for example, a conventional wired network connection or an optically transmissive wired network connection. The communication interface may also be a wireless connection, such as a wireless optical connection, a radio frequency connection, an infrared connection, or even an acoustic connection. The interface device 113 translates data and control signals from the master computer 103 and each of the slave computers 117 into network messages according to one or more communication protocols, such as the transmission control protocol (TCP), the user datagram protocol (UDP), and the Internet protocol (IP). These and other conventional communication protocols are well known in the art, and thus will not be discussed here in more detail.

Each slave computer 117 may include a memory 119, a processor unit 121, an interface device 123, and, optionally, one more input/output devices 125 connected together by a system bus 127. As with the master computer 103, the optional input/output devices 125 for the slave computers 117 may include any conventional input or output devices, such as keyboards, pointing devices, microphones, display monitors, speakers, and printers. Similarly, the processor units 121 may be any type of conventional or custom-manufactured programmable processor device. For example, one or more of the processor units 121 may be commercially generic programmable microprocessors, such as Intel®. Pentium®. or Xeon™ microprocessors, Advanced Micro Devices Athlon™ microprocessors or Motorola 68K/Coldfire®. microprocessors. Alternately, one or more of the processor units 121 may be custom-manufactured processors, such as microprocessors designed to optimally perform specific types of mathematical operations. Still further, one or more of the processor units 121 may have more than one core, as described with reference to FIG. 2 above. The memory 119 then may be implemented using any combination of the computer readable media discussed above. Like the interface device 113, the interface devices 123 allow the slave computers 117 to communicate with the master computer 103 over the communication interface.

In the illustrated example, the master computer 103 is a multi-processor unit computer with multiple processor units 111, while each slave computer 117 has a single processor unit 121. It should be noted, however, that alternate implementations of the technology may employ a master computer having single processor unit 111. Further, one or more of the slave computers 117 may have multiple processor units 121, depending upon their intended use, as previously discussed. Also, while only a single interface device 113 or 123 is illustrated for both the master computer 103 and the slave computers, it should be noted that, with alternate embodiments of the invention, either the computer 103, one or more of the slave computers 117, or some combination of both may use two or more different interface devices 113 or 123 for communicating over multiple communication interfaces.

With various examples of the computer system 101, the master computer 103 may be connected to one or more external data storage devices. These external data storage devices may be implemented using any combination of non-transitory computer readable media that can be accessed by the master computer 103. The computer readable media may include, for example, microcircuit memory devices such as read-write memory (RAM), read-only memory (ROM), electronically erasable and programmable read-only memory (EEPROM) or flash memory microcircuit devices, CD-ROM disks, digital video disks (DVD), or other optical storage devices. The computer readable media may also include magnetic cassettes, magnetic tapes, magnetic disks or other magnetic storage devices, punched media, holographic storage devices, or any other medium that can be used to store desired information. According to some implementations of the computer system 101, one or more of the slave computers 117 may alternately or additions be connected to one or more external non-transitory data storage devices. Typically, these external non-transitory data storage devices will include data storage devices that also are connected to the master computer 103, but they also may be different from any data storage devices accessible by the master computer 103.

It also should be appreciated that the description of the computer system 101 illustrated in FIG. 1 and FIG. 2 is provided as an example only, and it not intended to suggest any limitation as to the scope of use or functionality of various embodiments of the invention.

A net is generally taken to mean a physical connection (e.g. a wire) between two different pins. For example, a net can represent the connection of the source pin of one MOS transistor to the drain pin of another MOS transistor, or a connection between two pins of the same device. A path generally refers to a sequence of one or more nets. So, for example, a net may interconnect two transistors A and B while a path might connect transistor A to B to C to D, and so forth. A netlist describes a circuit, which is a collection of physical devices (transistors, resistors, diodes . . . ) that are hooked up via physical wires (e.g. made of aluminum, copper). A graph is a mathematical construct that can be used to represent a netlist. A graph is made up of vertices and edges. Often a graph vertex is used to represent a device and a graph edge is used to represent a net. All graphs have a topological dual and it is possible to turn every graph into its dual by replacing each edge with a vertex and each vertex with an edge. This replacement is sometimes used in circuit theory where it may be more convenient to think of a device as an edge and a net as a vertex. A node is used to mean a vertex in a graph and a device or net in a circuit.

Aggressive scaling of integrated circuit (IC) technologies continues to decrease device sizes and increase design complexity. In order to meet the high product quality and low defective-parts-per-million (DPPM) goals, scan-based structural testing becomes even more important than ever.

One of the challenges in generating effective scan test patterns in ATPG is to deal with timing exceptions in the design. In order to ensure correct operation of state elements, data and control inputs need to be held constant for specified time periods before and after any clock events. In this context, the time period before and after a clock event is called the setup time and hold time respectively. A timing exception violating the setup time requirements is called a setup-type timing exception. A timing exception violating the hold time requirements is called a hold-type timing exception. If transitions propagating along combinational paths can result in timing exceptions at certain state elements, these paths are referred to as timing exception paths. Timing exception paths are typically derived from timing exceptions provided by designers during synthesis and static timing analysis (STA). This data is usually provided in the Synopsys Design Constraints (SDC) format. By specifying timing exceptions, the designers define paths that should not be evaluated or evaluated exceptionally for timing during STA. Due to the increasing design complexity, the number of timing exception paths in modern high-performance designs can be hundreds to millions.

A timing exception path can be a false path, a multi-cycle path, or a conditional false path. Depending on the types of timing exceptions the sensitization of false paths can result in, they are classified into setup-type false paths and hold-type false paths. Multi-cycle paths are designed such that the logic values at the destinations of these paths are expected to be available after certain numbers of functional clock cycles. Conditional false paths are associated with Boolean conditions, which are logic value constraints on internal pins. They are provided to STA tools for computing and analyzing path delays. STA is only performed for a conditional false path if the Boolean conditions associated are satisfied. If the Boolean conditions associated are violated, the conditional false path is considered as a false path, and STA is not performed for it.

As described above, the transitions propagating along timing exception paths can cause values captured to be unreliable. These unreliable values are not used in functional operations. Using these unreliable values in test patterns may lead to simulation mismatches and result in good die being incorrectly identified as defective. Specifically, setup-type timing exceptions can affect the test responses of at-speed test patterns with multiple clock cycles, whereas hold-type timing exceptions can affect the test responses of any test pattern.

In order to avoid high yield loss, potentially unreliable signals can be masked with Xs (representing an unknown logic value) after test patterns are created, but before simulation is performed. In some cases, the state elements that are either the start or the end points of timing exception paths can be masked. The path information is not used in this method such that valid transitions can be masked out at state elements. This results in unnecessarily assigning unknown logic values to the test responses, causing an unnecessary loss of fault coverage. Other approaches include a path-oriented approach to handle the setup-type false paths, which can be further enhanced for hold-type false paths and conditional false paths. The path-oriented approach uses the timing exception paths information provided by the SDC files to analyze the sensitization of timing exception paths in each test pattern after its creation. The path-oriented approach only masks out the signals that are compromised by the sensitized timing exception paths.

Existing methods, as described above, are based on simulation after the test patterns are generated. They do not attempt to intervene in the process of ATPG. Hence, a generated test pattern can be invalid and discarded if the captured values that are required to detect the target fault are masked out due to the sensitization of timing exception paths. Thus, the test coverage drops, and the test quality suffers. Several iterations of test generation are typically required to generate new tests for the faults whose tests were found to be invalid. By randomizing the decision-making process, different tests are generated in different iterations. This increases the fault coverage, but it can also increase the test pattern count and overall ATPG runtime. More importantly, the intrinsic randomness of these approaches does not guarantee an acceptable test coverage even with multiple iterations of test generation.

Disclosed embodiments include the deterministic ATPG process called TEA to prevent timing exception effects from impacting the detection conditions of a generated test pattern for a target fault. TEA can be built on top of any existing fault-oriented ATPG algorithm, such as the D-algorithm or path-oriented decision making (PODEM). TEA is compatible with simulation-based approaches, which are currently the most accurate method to compute the test responses considering timing exception paths. In this simulation environment, TEA is complete such that for a target fault, the test pattern generated is guaranteed to detect it. If a test pattern cannot be generated using TEA, the target fault is untestable given the timing exception paths in the design and the current simulation environment.

Disclosed embodiments include a comprehensive process for addressing the challenge of directly generating valid test patterns in the presence of timing exception paths. According to various embodiments, a key to generating a valid test pattern for a target fault is to ensure that every logic value required for exciting the fault and propagating its effects is reliable. TEA achieves this by keeping track of the statuses of timing exception paths in the process of generating a test pattern. It ensures that the sensitized timing exception paths and their effects cannot reach any logic values required for detecting the target fault, and thus the test pattern generated is valid. Because TEA can generate a more effective test set than the existing simulation-based approaches with multiple iterations of test generation, the test coverage, test pattern count, and total ATPG run time are improved significantly.

Disclosed embodiments include improved processing for ATPG for digital designs with timing exceptions, such as false and multicycle paths, which are typically created from either a static timing analysis tool or a place and route tool. Disclosed embodiments achieve high test coverage with correct patterns that passes timing-based simulations. In specific embodiments disclosed processes addresses undetected-fault issues by considering timing exceptions during test generation, so that either the created patterns are guaranteed to detect the targeted faults, or the faults are proved to be untestable with the current timing exceptions during test generation.

Disclosed embodiments can generate effective test patterns which achieve higher test coverage, less pattern count and better ATPG run time, as compared to the prior solutions.

There are many types of timing exceptions (e.g. false paths, multicycle paths, case analysis, asynchronous clock groups, disable timing paths) in today's complex designs. Without considering these timing exceptions during test generation, the ATPG patterns that detect the target faults are no longer effective after the masking effect from the timing exceptions. On the other hand, the number of timing exceptions can be more than millions. Disclosed embodiments can analyze all timing exceptions and add only necessary and sufficient justifications to the existing test generation algorithm. Disclosed embodiments can ensure that the detection conditions of the generated pattern will not be masked by the timing exceptions. Disclosed embodiments can prove that the target fault is untestable if these extra justifications cannot be satisfied.

Disclosed embodiments address one of the most challenging and important issues of ATPG for modern designs and significantly improves ATPG performance and efficiency for designs with timing exceptions.

According to disclosed embodiments, an enhanced D-algorithm is formulated by combining T-values and logic values to consider fault effects and timing exception effects together, where Z values (high impedance) can also be used to support gates which produce or consume high impedance values. All basic D-algorithm elements including D-frontier, J-frontier, backward justification, forward implication, implication truth table, and justification decision tables are enhanced properly to address both effects. The disclosed processes can identify extra justifications to prevent timing exception impact to the detection condition of the generated test pattern. These extra justifications can be proved to be necessary and sufficient such that it can generate the most effective test patterns: the patterns are guaranteed to detect the target faults. If these patterns do not exist, the faults are not testable.

Timing Exception Path Handling

A timing exception path is defined with a from-point, a through-point, to-point. For example, in an SDC file, such a timing exception path is specified by a number of command options including -from, -to and -through. These options are followed by one or more circuit nodes such as gate ports, and internal pins. From-point is a start point of the timing exception path. Through-point is an intermediate point that the timing exception path goes through. To-point is an end point of the timing exception path. A timing exception path can have one or more from-points and one or more to-points. There is no restriction on the number of through-points, and there may be no through-point at all. The complete set of gates belonging to a timing exception path is referred to as the intersection cone of the timing exception path. The intersection cone includes every gate on a sub-path that starts from a from-point and ends at a through-point, starts from a through-point and ends at a to-point, as well as the gates between the from-point and the to-point. Thus, a timing exception path represents a subset of paths all of which are affected by the timing exception. The intersection cone for a timing exception path includes the area from the from-point to the through-point, and from the through-point to the to-point. The intersection cone of a circuit is the union of the intersection cones of all the timing exception paths.

An effect cone of a timing exception path contains every gate when tracing forward from the to-point to the end of time domain boundary. The effect cone of a circuit can be the combined effect cones of all the timing exception paths, or setup paths can be separated from hold paths.

The timing exception path cone is the union of intersection cone and effect cone. A gate can be part of intersection cone and effect cone.

As used herein, a required to-point (RTP) refers to a to-point of a timing exception paths which is identified to have a required logic value during D-algorithm (backward justification or backward implication) for a target fault. A triggered from-point (TFP) refers to a from-point of timing exception paths which is triggered by a defined timing exception event. Activated timing-exception paths (ATEP) refer to forward propagation paths of TFPs; that is, from all TFP, timing exception effects propagate forward. The forward propagation paths from all TFP are called activated timing-exception paths. ATEP includes all TFP.

Figure 3:
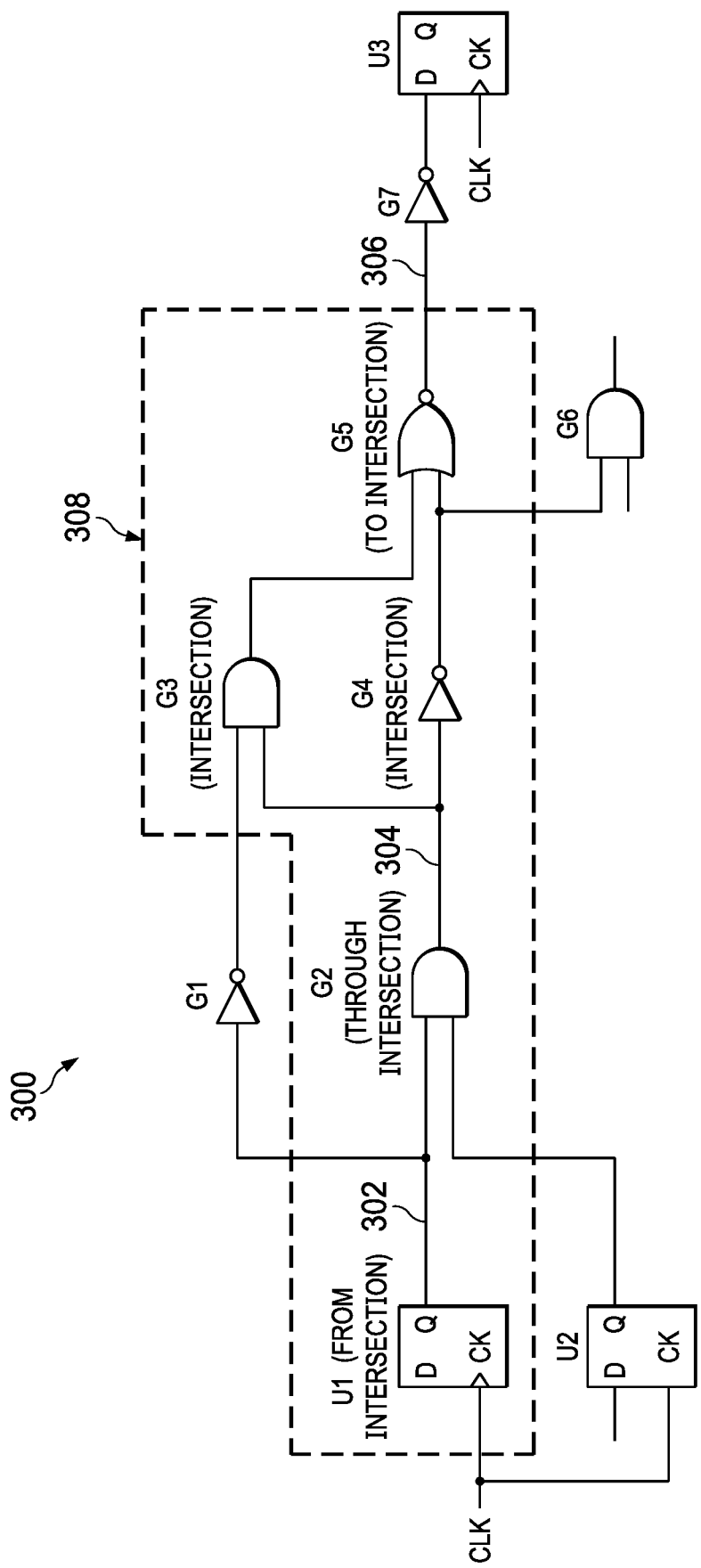
FIG. 3 illustrates an exemplary circuit with an intersection cone of timing exception paths in accordance with disclosed embodiments.

FIG. 3 illustrates an exemplary circuit 300 with an intersection cone 308 of timing exception paths in accordance with disclosed embodiments. A timing exception in this example path is defined with command options from U1/Q (the signal at 302), through G2/out (the signal at 304), and to G5/out (the signal at 306) in this circuit. The intersection cone of this timing exception path consists of U1, G2, G3, G4 and G5, as indicated by intersection cone 308. Intersection cone 308 excludes U2, G1, G6, G7 and U3.

In a simulation-based approach, the effects of timing exception paths are examined while simulating test patterns and computing test responses. For every test pattern generated, the sensitization of every timing exception path is checked as follows. First, the from-points of the timing exception path are examined. If the conditions of creating timing exception effects at a from-point are satisfied, the from-point is triggered. The details of the trigger conditions of from-points are described below.

When a from-point is triggered, the original logic value is stored and the logic value X is injected. Once all the from-points of this timing exception path are examined, and the Xs are injected at the triggered from-points (TFPs), their effects are propagated forward within the intersection cone. If the Xs are found at any to-points, they will mask out the original values of these to-points. The original state of the circuit other than the to-points affected is then restored. The test responses are computed by propagating forward the Xs remaining on to-points. For example, in FIG. 3, if U1 is triggered and the injected X (injected at D of U1) is propagated to G5, the masking effect is then propagated forward such that the logic values at G7 and U3 are masked out.

At a TFP, if the timing exception event is triggered, its output T-value is A.

With m timing exception paths, some processes can take the union of the intersection cones of all the timing exception paths. For every test pattern, all the from-points are checked to find all the TFPs. The Xs injected at all the TFPs are then propagated forward in the union of all the intersection cones. The original values of any to-points reached are masked out. After restoring the state of circuit, the test responses are computed by propagating forward the Xs remaining on all the to-points.

The disclosed TEA process is consistent with this approach. This approach ensures that all the timing exception paths are considered together for every test pattern. The cost is possible overmasking when a new path is created by the union of two intersection cones.

Trigger Conditions of from-Points

Disclosed embodiments address various trigger conditions of the from-points of setup-type false paths, multi-cycle paths, hold-type false paths and conditional false paths.

For setup-type false paths violations and multi-cycle paths, the from-points can only be triggered by test patterns with multiple functional clock cycles. A from-point of a setup-type false path is triggered at the current clock cycle if a transition is found on the from-point at any previous cycle. This is because there is no assumption on how long the delay of a false path can be. For a multi-cycle path, only n−1 previous cycles need to be examined for a from-point of an n-cycle paths. For hold-type false paths, the from-points are triggered at the current clock cycle when there is a transition at the next clock cycle. For conditional false paths, the from-points are triggered if the associated Boolean conditions are violated, and the conditions described above are violated.

Figure 4A:
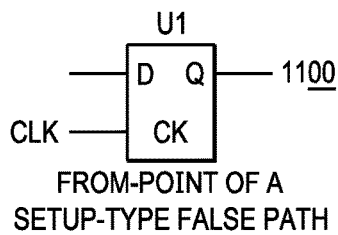
FIGS. 4A-4C illustrates examples of trigger conditions of from-points in accordance with disclosed embodiments.
Figure 4B:
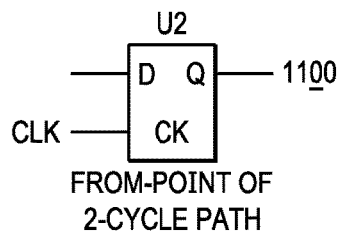
Figure 4C:
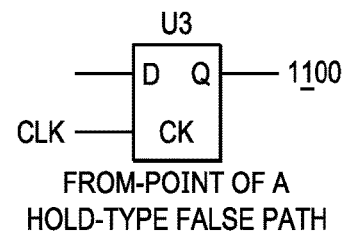

FIGS. 4A-4C illustrate examples of trigger conditions of from-points. Timing exception paths can include a hold-time false path, a setup-time false path, and a multi-cycle path. FIG. 4A shows a from-point U1 of a setup-type false path; FIG. 4B shows a from-point U2 of a 2-cycle path; and FIG. 4C shows a from-point U3 of a hold-type false path.

With respect to FIGS. 4A-4C, consider that a test pattern with four clock cycles t1, t2, t3 and t4 is generated. For this pattern, the logic values at U1/Q, U2/Q and U3/Q are 1, 1, 0 and 0 at clock cycles t1, t2, t3 and t4 respectively. At clock cycle t1, there is no at-speed transition in the past, nor transition that will occur at the next clock cycle. Hence all the from-points are not triggered. At clock cycle t2, both U1 and U2 are not triggered since there is no previous at-speed transition. For U3, there will be a falling transition (1→0) once the clock is pulsed, and thus it is triggered. At clock cycle t3, there is an at-speed falling transition (1→0) from t2 to t3, and thus both U1 and U2 are triggered. U3 is not triggered since no at-speed transition will occur at the next clock cycle. At clock cycle t4, U1 is triggered since there is an at-speed transition in the past, and U2 is not triggered since there is no at-speed transition from t3 to t4. U3 is not triggered since it is the last clock cycle. In FIGS. 4A-4C, the corresponding logic values are underscored at the clock cycles when the from-points are triggered.

Value System for Tea

The goal of any fault-oriented ATPG process is to find an input vector that can activate a fault and propagate the fault effects to an observe point so that the fault is detected. To achieve this, line justification objectives are created and satisfied in the process of test generation, so as to excite the target fault and propagate its effect. After a test cube is created, a test pattern is then generated by applying random fill or low-power fill on the test cube.

In the above process, a from-point of timing exception paths may be triggered, and the timing exception effects can then propagate forward within the intersection cone. The forward propagation paths from all the TFPs within the intersection cone is referred to herein as the activated timing exception paths (ATEPs). The ATEPs change dynamically during the process of test generation. As herein, during fault simulation, when ATEPs reach a to-point, the original logic value of the to-point is masked out. Therefore, if the logic value at this to-point is required in the process of test generation, this requirement fails as the logic value becomes unreliable. The to-points with logic values required in the process of test generation are referred to herein as required to-points (RTPs). Specifically, a gate that is a to-point of timing exception paths becomes an RTP if its output logic value is currently required for test generation.

Similar to ATEPs, RTPs change dynamically during the process of test generation. In order to generate a valid test pattern, a to-point cannot be reached by ATEPs once it becomes an RTP. In order to keep track of ATEPs and guarantee that they cannot reach RTPs, disclosed embodiments use "timing exception path values" (T-values) A, B and U to indicate whether a gate can be a part of ATEPs as follows:

A (Activated): It indicates that the gate is part of ATEPs.
B (Blocked): It indicates that the gate cannot be a part of ATEPs.
U (Undetermined): It indicates that it is undetermined whether the gate can be a part of ATEPs.

The T-values only exist in the intersection cone since ATEPs only exist in the intersection cone. Disclosed embodiments combine T-values with logic values, and can use, in some implementations, nine values (0A, 0B, 0U, 1A, 1B, 1U, XA, XB, XU) for line justification and implication in the intersection cone. During test generation, both the fault-free circuit and the faulty circuit should be considered to ensure that the fault effect can be propagated to an observe point. This can be achieved by using separate T-values in the good machine and faulty machine. However, simulation-based approaches only perform timing exception path analysis during good machine simulation. Thus, ATEPs can only exist in the fault-free circuit. In order to be compatible with the current simulation environment, in disclosed embodiments, only the fault-free values are combined with T-values in the intersection cone. For example, I/O is considered as 1T/0, where T represents a T-value. When computing the output T-value of a gate, the input value 1T/0 is considered as 1T.

With the T-values, a test pattern is guaranteed to be valid for the target fault in the current simulation environment if every to-point that is an RTP is assigned T-value B in the process of test generation. This also ensures that no RTP can be reached by ATEPs created during random fill or low-power fill after the test cube is generated.

Note that test generation processes as disclosed herein may backtrack when an RTP cannot be assigned a T-value B (indicating that the gate cannot be a part of ATEPs). The relevant RTPs are the ones that the process does not backtrack on. A backtrack-free version of the test generation process is achieved by ignoring incorrect decisions that were made during test generation and keeping only the ones for which backtracking did not occur. Disclosed embodiments can assume that a node in the decision tree is associated with a unique state of the circuit. This implies that all the line values are the same for a node regardless of when it is reached during the test generation process. With this assumption, if the process could have made only the decisions in its backtrack-free version, it would have followed the same path in the decision tree and generated the same test pattern.

Consider that a generated test pattern is guaranteed to be valid for the target fault in the current simulation environment if and only if all the RTPs in the backtrack-free version of the algorithm have T-value B. To show that this assumption is necessary, consider that the generated test pattern is guaranteed to detect the target fault. Assume by contradiction that an RTP has T-value A or U. This indicates that the RTP may be reached by an ATEP. Consequently, its logic value may be masked. Because this logic value is required for detecting the target fault, masking it will invalidate the test pattern. Thus, an RTP with T-value A or U contradicts the premise that the generated test pattern is guaranteed to detect the target fault.

To show that this assumption is sufficient, consider that all the RTPs in the backtrack-free version of the algorithm have T-value B. Assume by contradiction that the generated test pattern cannot detect the target fault. This requires an RTP to have T-value A, which contradicts the premise that all the RTPs have T-value B.

TEA Combined with the D-Algorithm

To generate a test pattern for a target fault, the D-algorithm first assigns the error signal D (1/0) or $\overline{D}$ (0/1) to the fault site. It then determines a set of logic values to be assigned to internal circuit nodes and PIs, so as to propagate D or $\overline{D}$ to an observe point and satisfy all the line justification objectives. In satisfying the conditions necessary to generate a test pattern, the D-algorithm is often faced with making decisions where there is more than one choice to propagate fault effects or justify the required logic values. Whenever a decision is made, the D-algorithm implies as many values that are uniquely determined by the current state of the circuit as possible. A decision tree is maintained during test generation. If the choice of a decision ultimately results in a conflicting assignment at a gate, then a decision must be remade using the decision tree in an attempt to find a successful test.

TEA improves upon the D-algorithm by using T-values combined with logic values in the intersection cone. The initial value for a gate in the intersection cone is XU, and for a gate outside the intersection cone is X. Line justification, implication, error signal propagation are described below, as well as conflict and backtracking in the intersection cone using TEA. Outside the intersection cone, the original D-algorithm is applied.

Line Justification in the Intersection Cone

To create a valid test pattern, proper values need to be assigned to the PIs, so as to excite the target fault and propagate the error signal to an observe point. This is accomplished by satisfying all the required line justification objectives. This is a recursive process in which the value of a gate output is justified by values of the gate inputs until PIs, scan cells, or pseudo-primary inputs (PPIs) are reached. When using TEA in the intersection cone, to justify 0T or 1T at the output of a gate, where T is A or U, the operation is the same as the one in the original D-algorithm. Thus, only logic values 0 and 1 need to be justified, and the T-values remain the same for every gate involved. This is because there is no requirement for blocking ATEPs at this gate. The justification for 0B and 1B at a gate needs to be considered separately as it requires that ATEPs cannot reach this gate.

The initial 0B and 1B justification objectives are created when logic values 0 and 1 need to be justified at the to-points. These to-points become to RTPs, and the T-value B is required so as to ensure that no ATEP can reach RTPs. For the justification of 0B and 1B at the output of an internal gate, consider an AND gate with two inputs.

Figure 5A:
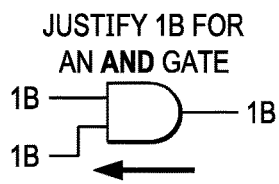
FIGS. 5A-5B illustrate examples of line justification in the intersection cone for an AND gate in accordance with disclosed embodiments.
Figure 5B:
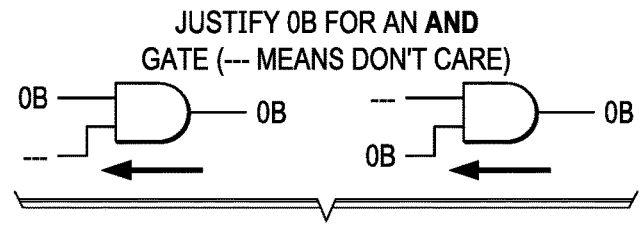

FIGS. 5A-5B illustrate examples of line justification in the intersection cone for an AND gate in accordance with disclosed embodiments. FIG. 5A illustrates the only way to justify a 1B output value. FIG. 5B illustrates the justification of a 0B output value, wherein only one input value needs to be 0B. This is because a 0B on an input blocks the other input values. Other types of gates can be justified in a similar manner. For the justification of 0B and 1B at a from-point of timing exception paths, the corresponding trigger conditions described herein need to be disabled.

For example, consider justifying 0B at clock cycle $t_n$ for a from-point N1 of a setup-type false path. To ensure that N1 is not triggered at $t_n$, the from-point N1 needs to have the same logic values 0 at all the previous clock cycles $t_1$, $t_2, \ldots, t_{n-1}$. This can be achieved by justifying logic values 0 on the output of N1 at $t^1, t_2, \ldots, t_{n-1}$, and leaving the T-values at $t_1, t_2, \ldots, t_{n-1}$ unchanged.

Implication in the Intersection Cone

The tasks of the implication process in the intersection cone are similar to the one in the original D-algorithm. It is used for computing all the values that can be uniquely determined by implication and for checking for value consistency. It also keeps track of the unsolved line justification objectives by using a set called the J-frontier. In the J-frontier, a gate whose output value is required to have 0U, 1U, 0A, or 1A is treated the same as regular J-frontier, which consists of all the gates whose output value is known but is not implied by its input values. The objectives in the enhanced J-frontier are handled as described herein.

According to disclosed embodiments, for any gate whose output value is not required to have 0U, 1U, 0A, or 1A—any gate whose output value is required to have 0B or 1B but is not implied by its input 9-values—is grouped using the 9-value implication table below. A gate can be in 9-value J-frontier twice, such as XU→0U→0B, or XU→1U→1B. Other values (XA, XB, XU) are not in J-frontier.

TABLE I below illustrates implication in the intersection cone for an AND gate with inputs $I_1$ and $I_2$ and output O, using T-values A, B and U in accordance with disclosed embodiments.

TABLE I

IMPLICATION IN THE INTERSECTION CONE FOR AND GATE

| $I_1$ | $I_2$ | O |
|---|---|---|
| 0B | — | 0B |
| — | 0B | 0B |

| $I_1$ | $I_2$ | O | $I_1$ | $I_2$ | O | $I_1$ | $I_2$ | O | $I_1$ | $I_2$ | O |
|---|---|---|---|---|---|---|---|---|---|---|---|
| 0A | 0A | 0A | 0U | 0A | 0U | 1B | 0A | 0A | 1A | 0A | 0A |
| 0A | 0U | 0U | 0U | 0U | 0U | 1B | 0U | 0U | 1A | 0U | 0U |
| 0A | 1B | 0A | 0U | 1B | 0U | 1B | 1B | 1B | 1A | 1B | 1A |
| 0A | 1A | 0A | 0U | 1A | 0U | 1B | 1A | 1A | 1A | 1A | 1A |
| 0A | 1U | 0A | 0U | 1U | 0U | 1B | 1U | 1U | 1A | 1U | 1A |
| 0A | XB | 0U | 0U | XB | 0U | 1B | XB | XB | 1A | XB | XU |
| 0A | XA | 0A | 0U | XA | 0U | 1B | XA | XA | 1A | XA | XA |
| 0A | XU | 0U | 0U | XU | 0U | 1B | XU | XU | 1A | XU | XU |

| $I_1$ | $I_2$ | O | $I_1$ | $I_2$ | O | $I_1$ | $I_2$ | O | $I_1$ | $I_2$ | O |
|---|---|---|---|---|---|---|---|---|---|---|---|
| 1U | 0A | 0A | XB | 0A | 0U | XA | 0A | 0A | XU | 0A | 0U |
| 1U | 0U | 0U | XB | 0U | 0U | XA | 0U | 0U | XU | 0U | 0U |
| 1U | 1B | 1U | XB | 1B | XB | XA | 1B | XA | XU | 1B | XU |
| 1U | 1A | 1A | XB | 1A | XU | XA | 1A | XA | XU | 1A | XU |
| 1U | 1U | 1U | XB | 1U | XU | XA | 1U | XA | XU | 1U | XU |
| 1U | XB | XU | XB | XB | XA | XB | XU | XU | XU | XB | XU |
| 1U | XA | XA | XB | XA | XU | XA | XA | XU | XU | XA | XU |
| 1U | XU | XU | XB | XU | XU | XA | XU | XU | XU | XU | XU |

(— means don't care)

There are two main differences in the implication process between the original D-algorithm and TEA. First, TEA uses nine values during the computation of values. For a from-point of timing exception paths, its T-value becomes A if its trigger conditions are satisfied. Its T-value becomes B if its trigger conditions are disabled. Otherwise, its T-value is U. For an internal gate in the intersection cone, the output value is computed based on its input values. For illustration, consider an AND gate with two inputs. The complete truth table for computing the output value of this gate based on the input values is illustrated in Table I above. Other truth tables and similar data is illustrated in FIGS. 11-20D, described below.

The second difference is that the forward implication stops at a to-point if the T-value implied by its input values is not B.

Figure 6A:
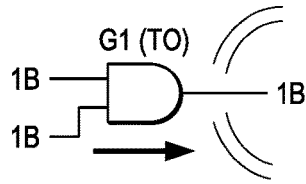
FIGS. 6A-6C illustrate examples of forward implication at to-points in accordance with disclosed embodiments.
Figure 6B:
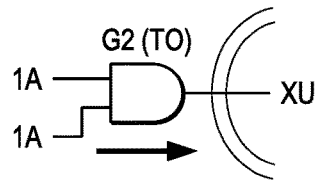
Figure 6C:
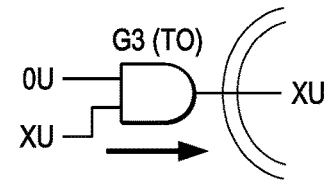

FIGS. 6A-6C illustrate examples of forward implication at to-points. In FIGS. 6A-6C, G1, G2 and G3 are to-points. The implied T-value at the output of G1 is B in FIG. 6A, and thus the forward implication continues. For G2 (in FIG. 6B) and G3 (in FIG. 6C), the forward implication stops since the implied T-values are not B.

As this is performed, a logic value propagated through a to-point may be part of the requirement for detecting the target fault. If the requirement can be satisfied by implication, there will be no line justification objective created on the output of this to-point. This case would will fail to identify the to-point as an RTP and would fail to require a T-value B on its output. As a result, the test pattern generated may be invalid. These problems are avoided by stopping the forward implication at a to-point.

Error Propagation in the Intersection Cone

In the process of propagating the error signal to an observe point, the D-algorithm maintains a set called the D-frontier. The D-frontier consists of all the gates whose output values are currently Xs and have one or more error signals on their inputs. Error propagation consists of selecting one gate from the D-frontier and assigning proper logic values to the unspecified gate inputs such that the error signal can be propagated forward. If the D-frontier becomes empty during this process, and the error signal is not propagated to an observe point, then backtracking should occur. As known to those of skill in the art, the standard D-algorithm uses five values—0, 1, X, D, and $\overline{D}$.

When using TEA in the intersection cone, the error propagation operation is similar to the one in the original D-algorithm. When propagating D or $\overline{D}$ through a gate in the intersection cone, only logic values need to be considered. The T-values remain the same for all the gates involved. The only difference is when a gate is a to-point of timing exception paths. In this case, the to-point becomes an RTP since its output value is required for error propagation. Hence, if the current output T-value implied by gate inputs is not B, a line justification objective is created to guarantee that this gate cannot be a part of ATEPs. If D is propagated to the gate output, 1B needs to be justified. Otherwise, 0B needs to be justified.

Figure 7:
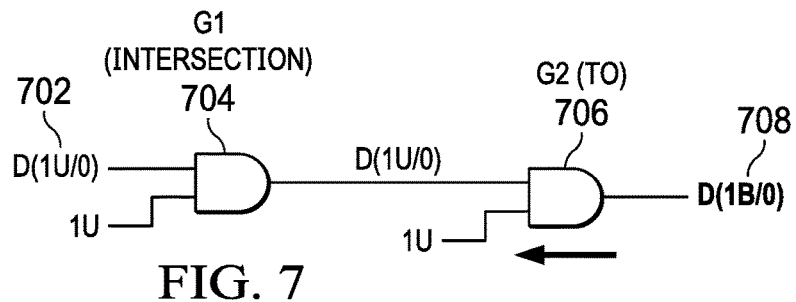
FIG. 7 illustrates an example of error propagation in the intersection cone in accordance with disclosed embodiments.

FIG. 7 illustrates an example of error propagation in the intersection cone. In this example, the error signal D 702, is propagated through intersection g1 and a to-point G2 706, and its output T-value implied by the input values is U. Therefore, an objective to justify 1B at its output 708 is created.

Conflict and Backtracking in the Intersection Cone

The process of line justification and error propagation often involves a decision process. Whenever there are several alternatives, the system can choose one of them to try. In doing so, the system can select a decision that leads to an inconsistency of values, which is referred to as a conflict. In the disclosed ATPG process, the conflicts happen in the intersection cone when at least one of the following is true:

There is an inconsistency of logic value (0 versus 1).
There is an inconsistency of T-value (B versus A).

Similar to the original D-algorithm, the system can use a decision tree to maintain all the decisions, and backtrack when a conflict occurs. This allows a systematic exploration of the complete space of possible solutions and recovery from incorrect decisions. Thus, if there exists a valid test pattern for a target fault, using TEA can ensure that this test pattern is found.

Boundary of the Intersection Cone

When doing the justification and implication at a gate on the boundary of the intersection cone, TEA needs the capability of switching between general logic value system and the disclosed system using T-values combined with logic values.

Figure 8A:
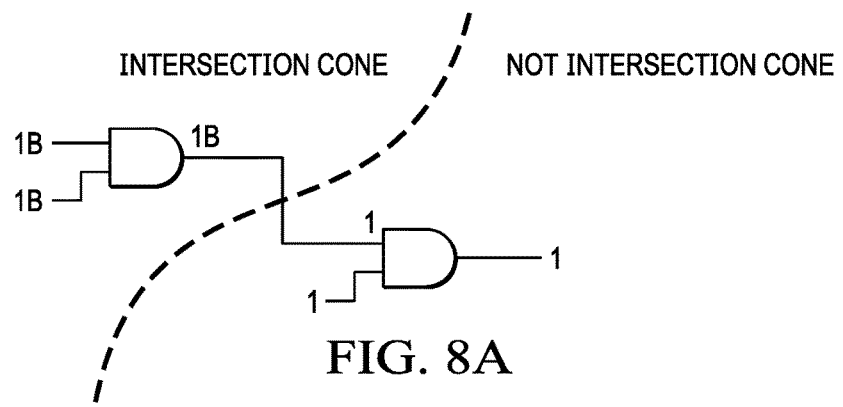
FIG. 8A-8B illustrate examples of handling the boundary of the intersection cone in accordance with disclosed embodiments.
Figure 8B:
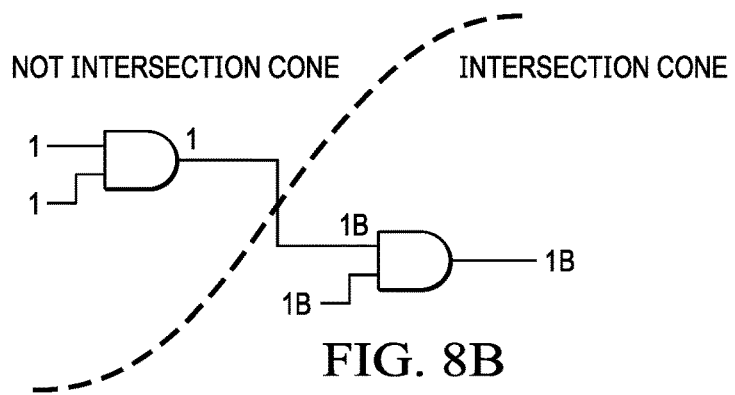

FIGS. 8A-8B illustrate examples of handling the boundary of the intersection cone in accordance with disclosed embodiments. If a logic value enters into the intersection cone, it is combined with a T-value B since the corresponding gate cannot be reached by ATEPs, as illustrated in FIG. 8B. This ensures that it is compatible with the disclosed system in the intersection cone. If a logic value with T-value leaves the intersection cone, as in FIG. 8A, its T-value is removed and the logic value remains. The same is true for forward or backward propagation through a time frame boundary—the logic value propagates through the time frame boundary, but the T-value does not. Where there is a gate fan-out to an intersection cone, it is treated as having T-value B.

TEA Combined with PODEM

Unlike the D-algorithm, which makes decisions at both PIs and internal gates, PODEM is an ATPG algorithm in which decisions consist only of primary input (PI) assignments. PODEM uses a backtracing procedure for mapping a line justification objective to a PI assignment that is likely to contribute to achieving the objective. Every PI reached by backtracing can be assigned to either 0 or 1. PODEM then performs forward implication with the current PI assignments to assign values to internal lines. Since the values are computed only by forward implication of PI assignments, a conflict can never happen during backtracing. Backtracking only occurs when the target fault cannot be excited, or the error signal cannot be propagated to an observe point.

TEA can be implemented in combination with PODEM by using T-values in the intersection cone. Outside the intersection cone, a PODEM technique is used. The backtracing procedure when using TEA is similar to the one in the original PODEM. Unlike the D-algorithm, PODEM does not require logic values on the internal lines other than the ones on the error propagation path. To ensure that the generated test pattern is valid, two enhancements can be applied for forward implication and backtracking. First, similar to the implementation of TEA using the D-algorithm, the forward implication stops at a to-point if the T-value implied by its input values is not B. Thus, it is possible that an objective on a gate output is still not satisfied even if every path in the fan-in cone of this gate is backtracked. When this occurs, backtracking is performed.

Second, if the backtracking is performed, and a decision needs to be remade on a from-point, it can have up to four options 0, 1, 0B and 1B. For the first two options 0 and 1, only logic values need to be assigned. The T-value at this from-point is determined based on its trigger conditions. For the last two options 0B and 1B, after assigning the logic values, the corresponding trigger conditions should be disabled.

Compared to existing simulation-based approaches, the TEA processes disclosed herein generate a more effective test set, and do not require multiple iterations of ATPG to achieve an acceptable test coverage. This results in significant improvement in test coverage, test pattern count, and total ATPG run time. Therefore, using TEA improves the overall test quality, reduces test cost, and significantly increases the test generation productivity in the presence of timing exception paths. The effectiveness of TEA were demonstrated by the experimental results on industrial designs.

Figure 9:
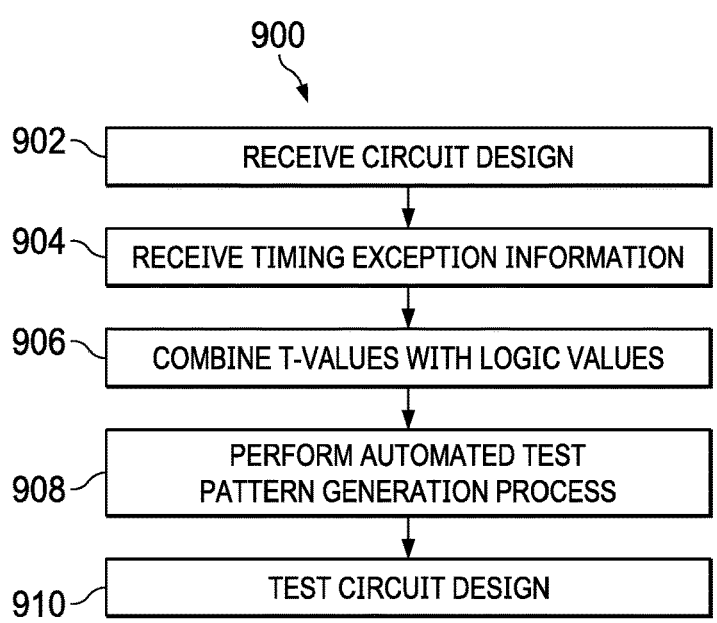
FIG. 9 illustrates a process in accordance with disclosed embodiments.

FIG. 9 illustrates a process 900 in accordance with disclosed embodiments that can be performed, for example, by a computer system as disclosed herein.

The computer system receives a circuit design that defines a circuit to be tested (902). "Receiving," in this case, can include loading from storage, receiving from another device or process, generating based on circuit information, receiving via an interaction with a user or otherwise. The circuit design has at least one timing exception path. The timing exception path can have, for example, one or more of a setup time exception, a hold time exception, a multicycle math, or a conditional timing exception.

The system receives timing exception information for the circuit design (904). In various cases, the timing exception information includes T-values for indicating a TFP and an ATEP. The TFP can be a from-point of a timing exception path that is triggered by a defined timing exception event. The ATEP can include the forward propagation paths of the TFP. The T-values can include three timing exception values that indicate that a gate is a part of an ATEP (A), that the gate cannot be a part of an ATEP (B), or that it is undetermined whether the gate can be a part of an ATEP (U). The T-values can be combined with logic values 1, 0, and X in logic combinations of 0A, 0B, 0U, 1A, 1B, 1U, XA, XB, and XU, where X indicates a don't-care. The logic combinations can be used for an ATPG implication process of the ATPG process. The logic values can also include a Z value to support gates which produce or consume a high impedance value.

The system can combine the T-values with logic values to indicate an RTP for detecting the fault in the circuit design (906).

The system performs an ATPG process that uses timing exception information to generate a test pattern for a targeted fault of the circuit design (908). In some cases, the ATPG process produces a test cube, and the test pattern is generated based on the test cube. The timing information is used to guide the ATPG process to avoid any generated test patterns for a target fault that can be invalidated due to a timing exception. That is, using a process as described herein, by guiding the ATPG process using timing exception information, the generated test pattern(s) are not invalidated due to timing exceptions. Note that while this exemplary process is described in terms of a single test pattern and a single fault, these principles apply to processes that generate one or more test patterns for one or more faults. In ATPG processes with dynamic compaction, one test cube can be generated to target multiple faults, and such processes fall within the scope of the disclosure.

During ATPG process, the system can monitor the ATEP and the RTP to ensure that the ATEP cannot reach any RTP. Similarly, an RTP with the T-value B ensures that the ATEP is blocked before reaching the RTP. The combined T-values and logic values can then be used in fault-propagation, forward implication, and backward justification in the ATPG process, for example using the truth tables described or illustrated herein. Further, in various embodiments, the ATPG logic values can use other values than just 0, 1, X and Z, such as forbidden values, other don't care values, or others. Similarly, T-values are not limited only to the particular T-values described herein, but can also include don't care values or other values useful to improve performance. Further, as understood by those of skill in the art, the particular labels used herein for the various logic values and T-values are exemplary and non-limiting and are intended to refer to any labels that represent the factors or values as described with respect to each value. Also, multiple sets of T-values can be used for different purposes or in different processes. Each set of T-values can be used for a different type of timing exception. For example, one set of T-values can be used for setup time and another set of T-values can be used for hold time. The T-values as described herein are used to indicate, among other things, the ATEP and the RTP during the ATPG process to ensure that the ATEP cannot reach the RTP in the generated test pattern(s).

The system tests the targeted fault of the circuit design using the test pattern to produce a test result for the targeted fault (910). This can be performed using the RTP, the TFP, and/or an ATEP to produce the test result of the fault. In specific cases, the ATEP cannot reach any RTP, and the RTP gates must have T-value "B," indicating that these RTP gates cannot be a part of ATEP.

Figure 10:
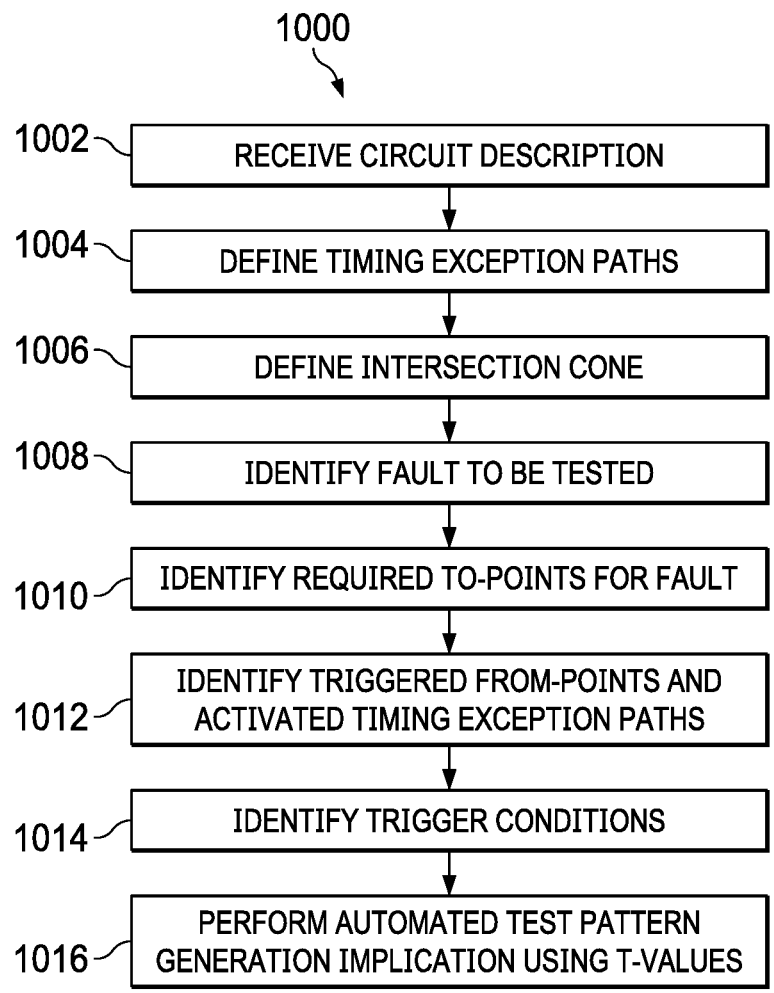
FIG. 10 illustrates a process in accordance with disclosed embodiments.

As another example of processes disclosed herein, FIG. 10 illustrates a process 1000 in accordance with disclosed embodiments that can be performed, for example, by a computer system as disclosed herein.

The computer system receives a circuit description that defines a circuit to be tested (1002). "Receiving," in this case, can include loading from storage, receiving from another device or process, generating based on circuit information, receiving via an interaction with a user or otherwise.

The system defines at least one timing exception path (TEP) in the circuit description (1004). The timing exception paths can be derived, for example, using a static timing analysis tool, or other electronic design automation tool, that describes the paths that do not meet the timing, such as the Synopsys PRIMETIME software product. Timing exception paths can be defined, for example, using the Synopsis Design Constraint (SDC) format, or can be a general description of paths which include one or more from-points, through-points, and/or to-points.

The system defines an intersection cone (1006). The intersection cone can be based on the TEP. The intersection cone can include every gate on each sub-path that starts from a from-point and ends at a through-point, starts from a through-point and ends at a to-point, or, more generally, is defined by one or more from-points, through-points, and/or to-points, and in specific cases is defined by a from-point and a to-point. The system can also define an intersection cone for the circuit that is the union of all of the intersection cones based on the TEPs. The system can also define an effect cone for the TEP that includes every gate from the to-point to the end of the state elements, and an effect cone for the circuit that is the union of all of the intersection cones based on the TEPs. The TEP cone is the union of the intersection cone and effect cone.

The system identifies the faults in the circuit to be tested based on the circuit description and a fault model (1008). These can include, for example, a stuck-at fault model, a transition fault model, a toggle fault model, an IDDQ fault model, a Bridge fault model, an at-speed path fault model, or a user-defined fault model.

For each fault f identified at 1008, the system performs following steps. Note, in particular, that processes as in 1010-1016 below can be performed separately from the preceding processes as long as the circuit description, fault(s) to be tested, and certain other data is known to the system.

The system identifies RTPs for detecting fault f using an ATPG algorithm (1010). This can be performed, for example, using the known D-algorithm or using another such process. RTPs are the to-points that are justified dynamically to a known value to detect f.

The system identifies TFPs and ATEPs according to the intersection cone and RTPs of the targeted fault f (1012). The ATEPs can be the forward propagation paths from all the TFPs within the intersection cone.

The system identifies trigger conditions for each TFP (1014). The trigger conditions can be identified according to setup-type false paths, multi-cycle paths, hold-type false paths, or conditional false paths. The trigger conditions determine the range of the justification frames for each TFP.

The system performs an ATPG implication process on TFPs and ATEPs using T-values to produce a test result for the circuit description (1016). This can include applying the T-value implications according to the logic tables of different gate types. The T-values can be combined with logic values to produce the test result of the fault. Table I above illustrates an example of a T-value logic table for an AND gate. Other truth tables and similar data is illustrated in FIGS. 11-20D, described below.

The test result in 1016 can be a test cube. In 1016, when the test cube is created as the test result to detect the fault, the test cube is stored as the test result and the system determines that the fault is detected. When the test cube cannot be created with all justification decisions so that the test result is the test cube, the system determines and the test result can indicate that the fault f is ATPG untestable (that is, no test cube is generated for untestable faults). When the backtrack limit has reached before all decisions have tied in the ATPG process, the system determines and the test result can indicate that the fault f is an ATPG abort. As part of 1016, the system can also generate a test pattern based on the test cube.

Figures 11, 16:
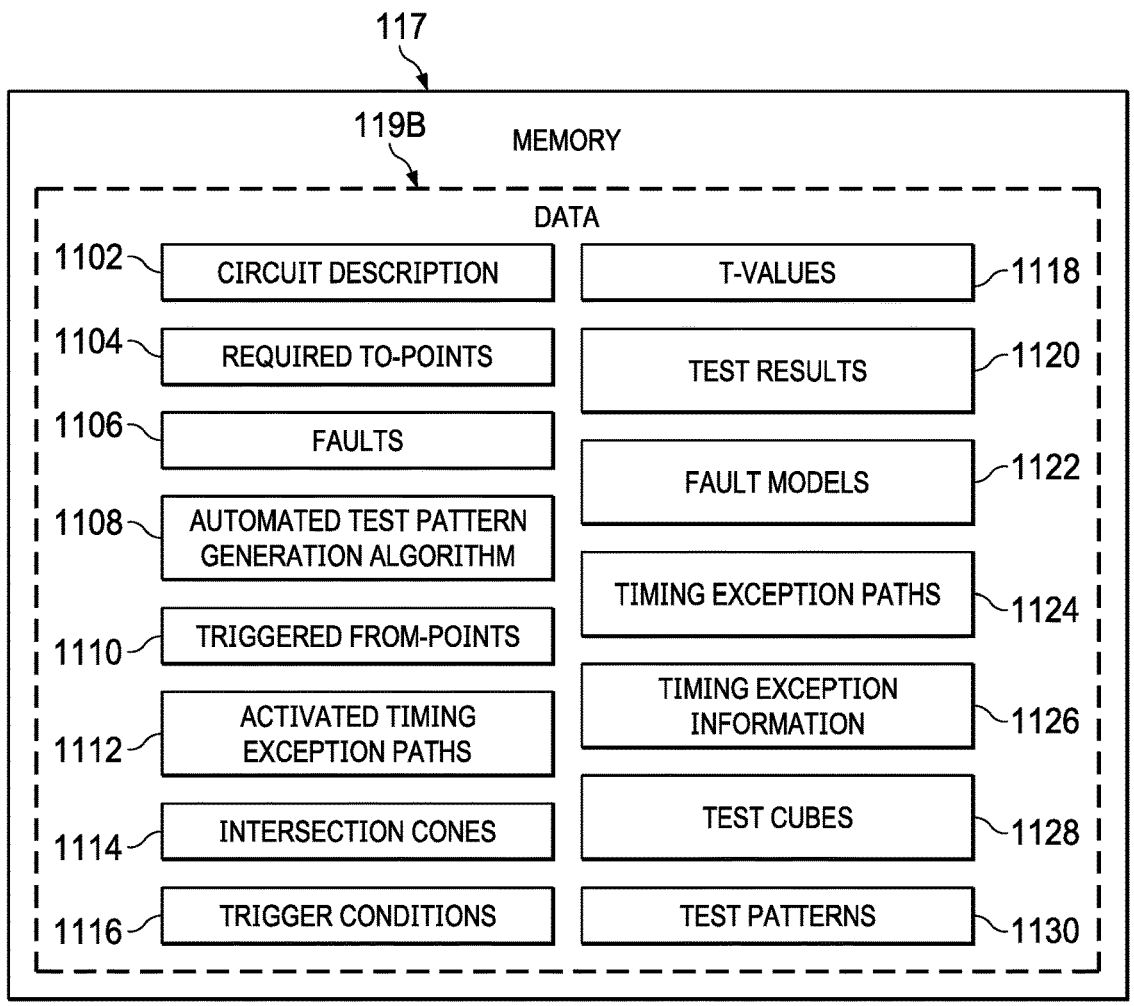
FIG. 11 illustrates examples of data usable for performing processes as described herein.
FIG. 16 illustrates a nine-value implication table for a 2×1 multiplexer using T-values in combination with logic values in accordance with disclosed embodiments.

As described above with respect to FIG. 1, the data 109B usable for performing processes described herein can be stored in memory 107. FIG. 11 illustrates examples of data usable for performing processes as described herein. This data includes circuit description 1102, RTPs 1104, faults 1106, ATPG algorithm 1108, TFPs 1110, ATEPs 1112, intersection cones 1114, trigger conditions 1116, T-values 1118, test results 1120, and fault models 1122. Any other data described herein can also be stored as data 109B.

FIGS. 12A-12C illustrate a D-propagation truth tables using T-values in accordance with disclosed embodiments. T is the original T-value, assume only one D-$\overline{D}$ at the inputs of a gate. FIG. 12A illustrates a D-propagation truth table for a 2-input AND; FIG. 12B illustrates a D-propagation truth table for a 2-input OR; FIG. 12C illustrates a D-propagation truth table for a 2-input XOR; and FIG. 12D illustrates a D-propagation truth table for a 2×1 multiplexer (MUX). If the propagation is through a to-point, a RTP is created (U→B will create a 9-value J-frontier).

FIG. 13 illustrates an implication table for a 2-input AND gate using T-values in combination with logic values as described herein.

FIG. 14 illustrates an implication table for a 2-input OR gate using T-values in combination with logic values as described herein.

FIG. 15 illustrates an implication table for a 2-input OR gate using T-values in combination with logic values as described herein.

FIG. 16 illustrates an implication table for a 2×1 MUX using T-values in combination with logic values as described herein. In this example, the 2×1 MUX has three inputs, X0, X1 and select (s). This example illustrates when the select s=0B, 0A or 0U, and only the value of X0 matters. The MUX implication tables are used for a forward implication truth table of MUX gates. They are different at "select" input values.

FIGS. 17A and 17B illustrate an implication table for a 2×1 MUX using T-values in combination with logic values as described herein. In this example, the 2×1 MUX has three inputs, X0, X1 and select (s). This example illustrates when the select s=XB, both of the values of X1 and X0 matter.

FIG. 18 illustrates an implication table for a 2×1 using T-values in combination with logic values as described herein. In this example, the 2×1 MUX has three inputs, X0, X1 and select (s). This example illustrates when the select s=XA, both of the values of X1 and X0 matter. This example shows a limited number of specific cases, and any cases not illustrated result in output XA.

FIG. 19 illustrates an implication table for a 2×1 MUX using T-values in combination with logic values as described herein. In this example, the 2×1 MUX has three inputs, X0, X1 and select (s). This example illustrates when the select s=XU, both of the values of X1 and X0 matter. This example shows a limited number of specific cases, and any cases not illustrated result in output XU.

FIGS. 20A-20D illustrate nine-value J-justification truth tables. These tables are used for T-values U and A, and in each of these tables, T is either U or A. FIG. 20A illustrates a 2-input AND gate; FIG. 20B illustrates a 2-input OR gate; FIG. 20C illustrates a 2-input XOR gate; and FIG. 20D illustrates a 2×1 MUX.

FIGS. 21A-21D illustrate nine-value justification truth tables. FIG. 21A illustrates a 2-input AND gate; FIG. 21B illustrates a 2-input OR gate; FIG. 21C illustrates a 2-input XOR gate; and FIG. 21D illustrates a 2×1 MUX.

One disclosed method includes identifying a required to-point (RTP) for detecting a fault in a circuit description by using an automated test pattern generation (ATPG) algorithm. The method includes identifying a triggered from-point (TFP) and an activated timing-exception path (ATEP) according to an intersection cone of the circuit description and the RTP. The method includes identifying one or more trigger conditions for the TFP. The method includes performing an ATPG implication process with the TFP and the ATEP using timing exception path values (T-values) to produce a test result for the circuit description, wherein T-values are combined with logic values to produce the test result of the fault.

In various embodiments, the method also includes receiving the circuit description, where the circuit description defines a circuit to be tested, defining a timing exception path (TEP) in the circuit description using the T-values, defining the intersection cone based on the TEP, and identifying the fault according to the circuit description and a fault model, wherein the fault is a fault to be tested in the circuit description.

In various embodiments, the fault model is one of a stuck-at fault model, a transition fault model, a toggle fault model, an IDDQ fault model, a Bridge fault model, an at-speed path fault model, or a user-defined fault model. In various embodiments, the intersection cone is defined according to one or more from-points, through-points, and/or to-points. In various embodiments, the T-values are three timing exception values that indicate that a gate is a part of an ATEP (A), that the gate cannot be a part of an ATEP (B), or that it is undetermined whether the gate can be a part of an ATEP (U). In various embodiments, the T-values are combined with logic values in the ATPG implication process. In various embodiments, the logic values are 1, 0, and X. In various embodiments, the TFP is a from-point of a timing exception path that is triggered by a defined timing exception event, and the ATEP includes the forward propagation paths of the TFP. In various embodiments, the T-values include activated (A), blocked (B), and undetermined (U), the T-values are combined with logic values 1, 0, and X in logic combinations of 0A, 0B, 0U, 1A, 1B, 1U, XA, XB, and XU, where X indicates a don't-care, and the logic combinations are used for the ATPG implication process. In various embodiments, the test result is a test cube, and a test pattern is generated based on the test cube.

The following documents describe other ATPG-related issues, and are hereby incorporated by reference:

B. R. Benware, R. Madge, C. Lu, and R. Daasch, "Effectiveness Comparisons of Outlier Screening Methods for Frequency Dependent Defects on Complex ASICs", in Proc. VLSI Test Symp., 2003, pp. 39-46.

W. Needham, C. Prunty and E. H. Yeoh, "High Volume Microprocessor Test Escapes, an Analysis of Defects our Tests are Missing", in Proc. Int. Test Conf, 1998, pp. 25-34.

J. P. Roth, "Diagnosis of automata failures: A calculus and a method", IBM J. Res. Develop., vol. 10, pp. 278-291, 1966.

P. Goel, "An implicit enumeration algorithm to generate tests for combinational logic circuits", IEEE Trans. Comput., vol. C-30, pp. 215-222, 1981.

X. Lin, R. Press, J. Rajski, P. Reuter, T. Rinderknecht, B. Swanson and N. Tamarapalli, "High-frequency, at-speed Scan Testing", IEEE Design & Test of Computers, vol. 20, no. 5, pp. 17-25, 2003.

N. Tendolkar, R. Raina, R. Woltenberg, X. Lin, B. Swanson and G. Aldrich, "Novel techniques for achieving high at-speed transition fault test coverage for Motorola's microprocessors based on PowerPC instruction set architecture", in Proc. VLSI Test Symp., 2002, pp. 3-8.

J. Saxena, K. Butler, J. Gatt, R. Raghuraman, S. Kumar, S. Basu, D. Campbell and J. Berech, "Scan-Based Transition Fault Testing—Implementation and Low Cost Test Challenges", in Proc. Int. Test Conf, 2002, pp. 1120-1129.

B. Cory, R. Kapur and B. Underwood, "Speed Binning with Path Delay Test in 150-nm Technology", IEEE Design & Test of Computers, vol. 20, no. 5, pp. 41-45, 2003.

K. S. Kim, S. Mitra and P. G. Ryan "Delay Defect Characteristics and Testing Strategies", IEEE Design & Test of Computers, vol. 20, no. 5, pp. 8-16, 2003.

J. Rearick, "Too much delay fault coverage is a bad thing", in Proc. Int. Test Conf, 2001, pp. 624-633.

S. M. Reddy, I. Pomeranz, S. Kajihara, A. Murakami, S. Takeoka and M. Ohta, "On validating data hold times for flip-flops in sequential circuits", in Proc. Int. Test Conf, 2000, pp. 317-325.

T. L. McLaurin, R. Slobodnik, K.-H. Tsai and A. Keim, "Enhanced testing of clock faults", in Proc. Int. Test Conf, 2007, pp. 1-9.

V. Vorisek, B. Swanson, K.-H. Tsai and D. Goswami, "Improved Handling ofFalse and Multicycle Paths in ATPG", in Proc. VLSI Test Symp., 2006, pp. 160-165.

D. Goswami, K.-H. Tsai, M. Kassab, T. Kobayashi and J. Rajski, "Test Generation in the Presence of Timing Exceptions and Constraints", in Proc. Design Autom. Conf, 2007, pp. 688-693.

K.-H. Tsai and X. Lin, "Multicycle-Aware At-speed Test Methodology", in Proc. Asian Test Symp., 2013, pp 49-55

K.-H. Tsai and S. Gopalakrishnan, "Test Coverage Analysis for Designs with Timing Exceptions", in Proc. Asian Test Symp., 2017, pp. 169-174

Those skilled in the art will recognize that, for simplicity and clarity, the full structure and operation of all data processing systems or computer systems suitable for use with the present disclosure is not being depicted or described herein. Instead, only so much of a data processing system or computer system as is unique to the present disclosure or necessary for an understanding of the present disclosure is depicted and described. The remainder of the construction and operation of the data processing system may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form. Various process steps can be omitted, repeated, performed sequentially or concurrently with other steps or processes, or combined with other steps or processes. The features or steps disclosed herein can be combined or exchanged with others within the scope of the disclosure.

None of the description in the present application should be read as implying that any particular element, step, or function is an essential element which must be included in the claim scope: the scope of patented subject matter is defined only by the allowed claims. Moreover, none of these claims are intended to invoke 35 USC § 112(f) unless the exact words "means for" are followed by a participle. The use of terms such as (but not limited to) "mechanism," "module," "device," "unit," "component," "element," "member," "apparatus," "machine," "system," "processor," or "controller," within a claim is understood and intended to refer to structures known to those skilled in the relevant art, as further modified or enhanced by the features of the claims themselves, and is not intended to invoke 35 U.S.C. § 112(f).

What is claimed is:

1. A method performed by computer system, comprising:
   performing an automated test pattern generation (ATPG) process to generate a test pattern for a targeted fault of a circuit design with at least one timing exception path by using timing exception information having timing exception values configured to indicate a type of relationship between a gate and an activated timing-exception path (ATEP) in the circuit design; and
   testing the targeted fault of the circuit design using the test pattern to produce a test result for the targeted fault.

2. The method of claim 1, wherein the timing exception path includes one or more of a setup time exception, a hold time exception, a multicycle path, or a conditional timing exception.

3. The method of claim 1, wherein the timing exception values for indicating a triggered from-point (TFP) and the ATEP.

4. The method of claim 3, wherein the TFP is a from-point of a timing exception path, of the at least one timing exception path, that is triggered by a defined timing exception event, and the ATEP includes forward propagation paths of the TFP.

5. The method of claim 1, further comprising combining the timing exception values with logic values to indicate a required to-point (RTP) for detecting the fault in the circuit design, wherein the logic values include 1, 0, and X indicating a don't-care value.

6. The method of claim 1, wherein testing the targeted fault of the circuit design includes using a required to-point (RTP), a triggered from-point (TFP), and the ATEP to produce the test result of the fault.

7. The method of claim 1, wherein:
   the timing exception values T indicate the type of relationship between the gate and the ATEP in the circuit design as that a the gate being a part of the ATEP, the gate not being a part of the ATEP, or that it is undetermined whether the gate is a part of the ATEP, and
   the timing exception values are combined with logic values 1, 0, and X in logic combinations, where X indicates a don't-care, and
   the logic combinations are used for an ATPG implication process of the ATPG process.

8. The method of claim 7, wherein the logic values also include a Z value to support gates which produce or consume a high impedance value.

9. The method of claim 1, wherein the ATPG process produces a test cube, and the test pattern is generated based on the test cube.

10. A computer system comprising:
    a processor; and
    an accessible memory, the computer system configured to:
      perform an automated test pattern generation (ATPG) process to generate a test pattern for a targeted fault of a circuit design with at least one timing exception path by using timing exception information having timing exception values configured to indicate a type of relationship between a gate and an activated timing-exception path (ATEP) in the circuit design; and test the targeted fault of the circuit design using the test pattern to produce a test result for the targeted fault.

11. The computer system of claim 10, wherein the timing exception path includes one or more of a setup time exception, a hold time exception, a multicycle math, or a conditional timing exception.

12. The computer system of claim 10, wherein the timing exception values indicate a triggered from-point (TFP) and the ATEP.

13. The computer system of claim 12, wherein the TFP is a from-point of a timing exception path, of the at least one timing exception path, that is triggered by a defined timing exception event, and the ATEP includes forward propagation paths of the TFP.

14. The computer system of claim 10, wherein the computer system is further configured to combine the timing exception values with logic values to indicate a required to-point (RTP) for detecting the fault in the circuit design, wherein the logic values include 1, 0, and X indicating a don't-care value.

15. The computer system of claim 10, wherein testing the targeted fault of the circuit design includes using a required to-point (RTP), a triggered from-point (TFP), and the ATEP to produce the test result of the fault.

16. The computer system of claim 10, wherein:
the timing exception values indicate the type of relationship between the gate and the ATEP in the circuit design as the gate being a part of the ATEP, the gate not being a part of the ATEP, or that it is undetermined whether the gate is a part of the ATEP, and
the timing exception values are combined with logic values 1, 0, and X in logic combinations, where X indicates a don't-care, and
the logic combinations are used for an ATPG implication process of the ATPG process.

17. The computer system of claim 16, wherein the logic values also include a Z value to support gates which produce or consume a high impedance value.

18. The computer system of claim 10, wherein the test result is a test cube, and a test pattern is generated based on the test cube.

19. A non-transitory computer-readable medium storing with executable instructions that, when executed, cause one or more computer systems to:
perform an automated test pattern generation (ATPG) process to generate a test pattern for a targeted fault of a circuit design with at least one timing exception path by using timing exception information having timing exception values configured to indicate a type of relationship between a gate and an activated timing-exception path (ATEP) in the circuit design; and
test the targeted fault of the circuit design using the test pattern to produce a test result for the targeted fault.

20. The non-transitory computer-readable medium of claim 19, wherein the timing exception values indicate a triggered from-point (TFP) and an activated timing-exception path (ATEP), and wherein the TFP is a from-point of a timing exception path, of the at least one timing exception path, that is triggered by a defined timing exception event, and the ATEP includes forward propagation paths of the TFP.

* * * * *